US012453555B2

(12) United States Patent
Deck et al.

(10) Patent No.: US 12,453,555 B2
(45) Date of Patent: Oct. 28, 2025

(54) FIRING LOCKOUT FOR LINEAR SURGICAL STAPLER

(71) Applicant: Cilag GmbH International, Zug (CH)

(72) Inventors: Andrew C. Deck, Cincinnati, OH (US); Matthew S. Williamson, Milford, OH (US); John J. Newman, West Chester, OH (US)

(73) Assignee: Cilag GmbH International, Zug (CH)

( * ) Notice: Subject to any disclaimer, the term of this patent is extended or adjusted under 35 U.S.C. 154(b) by 0 days.

(21) Appl. No.: 18/509,723

(22) Filed: Nov. 15, 2023

(65) Prior Publication Data

US 2025/0152170 A1    May 15, 2025

(51) Int. Cl.
| | | |
|---|---|---|
| *A61B 17/072* | (2006.01) | |
| *A61B 17/068* | (2006.01) | |
| A61B 17/00 | (2006.01) | |
| A61B 17/28 | (2006.01) | |
| A61B 17/29 | (2006.01) | |

(52) U.S. Cl.
CPC ...... *A61B 17/07207* (2013.01); *A61B 17/068* (2013.01); *A61B 17/072* (2013.01); *A61B 2017/00367* (2013.01); *A61B 2017/00477* (2013.01); *A61B 2017/07214* (2013.01); *A61B 2017/07271* (2013.01); *A61B 17/2833* (2013.01); *A61B 2017/2927* (2013.01)

(58) Field of Classification Search
CPC ............... A61B 17/068; A61B 17/072; A61B 17/07207; A61B 17/115; A61B 17/2833; A61B 2017/00477; A61B 2017/07214; A61B 2017/07271; A61B 2017/2927

USPC ............. 227/19, 175.1, 175.2, 176.1, 180.1; 606/1, 139, 219

See application file for complete search history.

(56) References Cited

U.S. PATENT DOCUMENTS

| | | | | |
|---|---|---|---|---|
| 5,141,144 A | * | 8/1992 | Foslien | ............ A61B 17/07207 227/176.1 |
| 7,631,794 B2 | * | 12/2009 | Rethy | .............. A61B 17/07207 227/19 |

(Continued)

OTHER PUBLICATIONS

International Search Report and Written Opinion dated Feb. 27, 2025, for International Application No. PCT/IB2024/061413, 13 pages.

*Primary Examiner* — Scott A Smith
(74) *Attorney, Agent, or Firm* — Frost Brown Todd LLP

(57) ABSTRACT

An apparatus includes first and second stapler halves that selectively couple together and separate from one another, and a clamp member actuatable to approximate the stapler halves to clamp tissue. A firing assembly is actuatable through a firing stroke to fire the stapling assembly on clamped tissue. The firing assembly includes a firing actuator movable between a retracted position and a deployed position in which the firing actuator is configured to actuate the firing assembly through the firing stroke, and a firing lockout member movable between an engaged position in which the firing lockout member inhibits advancement of the firing assembly through the firing stroke, and a disengaged position in which the firing lockout member permits advancement of the firing assembly through the firing stroke. The firing lockout member is configured to assume the disengaged position only when the firing actuator is in the deployed position.

20 Claims, 26 Drawing Sheets

(56) References Cited

U.S. PATENT DOCUMENTS

| | | | | |
|---|---|---|---|---|
| 8,348,129 B2* | 1/2013 | Bedi | ................ | A61B 17/0686 |
| | | | | 227/19 |
| 8,523,041 B2* | 9/2013 | Ishitsuki | ............ | A61B 17/1152 |
| | | | | 227/19 |
| 8,789,740 B2* | 7/2014 | Baxter, III | ....... | A61B 17/07207 |
| | | | | 227/19 |
| 9,155,537 B2* | 10/2015 | Katre | ................ | A61B 17/07207 |
| 9,539,007 B2* | 1/2017 | Dhakad | ............ | A61B 17/07207 |
| 9,724,095 B2* | 8/2017 | Gupta | ................ | A61B 17/0682 |
| 10,667,818 B2* | 6/2020 | McLain | ............. | A61B 17/3205 |
| 10,874,398 B2* | 12/2020 | Baxter, III | .......... | A61B 17/1114 |
| 10,898,187 B2* | 1/2021 | Deck | .................... | A61B 17/072 |
| 10,905,419 B2* | 2/2021 | Schings | ............ | A61B 17/07207 |
| 11,033,266 B2* | 6/2021 | Jones | ................ | A61B 17/07207 |
| 11,045,193 B2 | 6/2021 | Schings et al. | | |
| 11,229,433 B2* | 1/2022 | Schings | ............ | A61B 17/07207 |
| 11,278,285 B2* | 3/2022 | Deck | ................ | A61B 17/07207 |
| 11,786,242 B2* | 10/2023 | Deck | ................ | A61B 17/07207 |
| | | | | 227/175.4 |
| 12,016,555 B2 | 6/2024 | Wang | | |
| 2013/0140343 A1* | 6/2013 | Knodel | ................ | A61B 17/068 |
| | | | | 227/176.1 |
| 2013/0306703 A1* | 11/2013 | Ehrenfels | ............. | A61B 17/105 |
| | | | | 227/176.1 |
| 2016/0262756 A1* | 9/2016 | Patankar | .......... | A61B 17/07207 |
| 2017/0143336 A1* | 5/2017 | Shah | ................ | A61B 17/07207 |
| 2020/0046353 A1* | 2/2020 | Deck | ................ | A61B 17/07207 |
| 2023/0397911 A1 | 12/2023 | Deck et al. | | |

\* cited by examiner

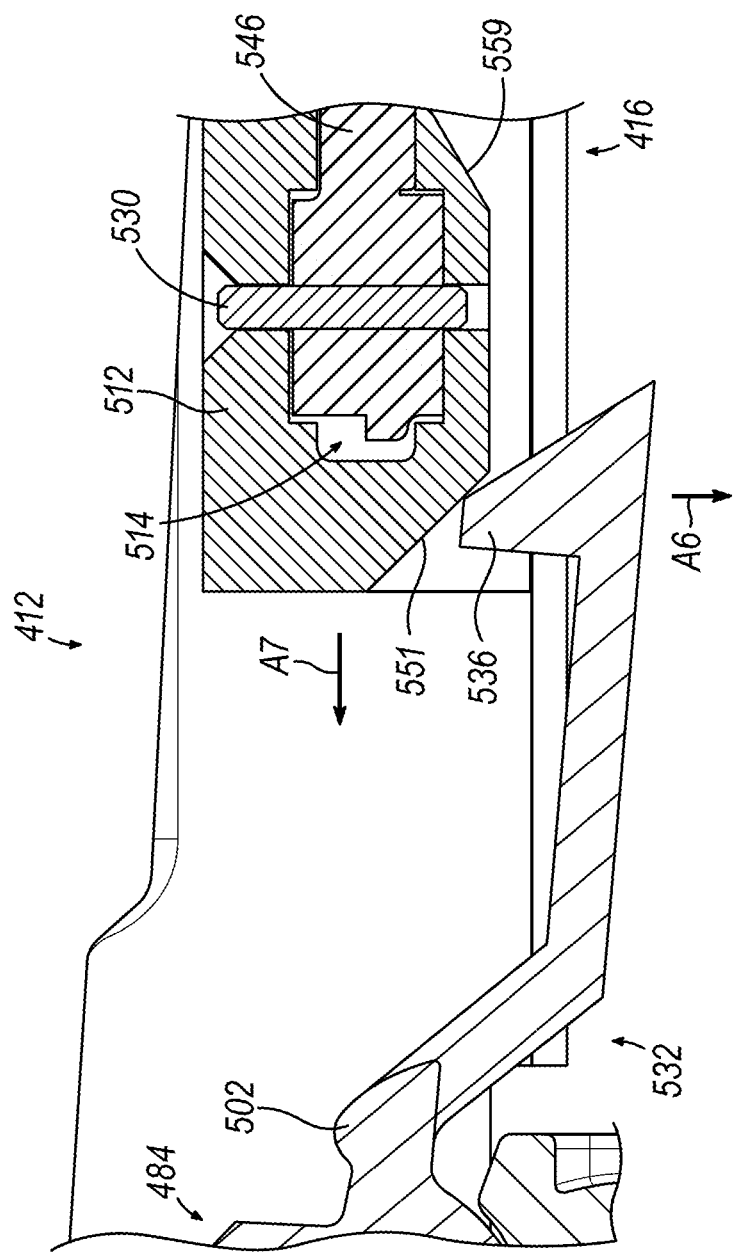

FIRING LOCKOUT FOR LINEAR SURGICAL STAPLER

BACKGROUND

In some surgical operations, such as a gastrointestinal anastomosis, it may be desirable to clamp down on one or more layers of tissue, cut through the clamped layers, and simultaneously drive staples through the layers to substantially seal the severed layers together near their severed ends. One such instrument that may be used in such operations is a linear surgical stapler, also referred to as a "linear cutter." A linear surgical stapler generally includes a first half (referred to as a "cartridge half" or "reload half") having a distal jaw configured to support a staple cartridge (or "reload"), and a second half (referred to as an "anvil half") having a distal jaw that supports an anvil surface having staple forming features. The stapler further includes a movable clamp lever configured to releasably clamp the stapler halves together. The stapler halves are configured to releasably couple together and pivot relative to one another to clamp tissue positioned between the two distal jaws when the clamp lever is closed. A firing assembly of the stapler is configured to be actuated to cut the clamped layers and simultaneously drive staples through the tissue on either side of the cut line. After the stapler is fired, the clamp lever may be opened, and the stapler halves separated to release the severed and stapled tissue.

While various kinds of surgical stapling instruments and associated components have been made and used, it is believed that no one prior to the inventor(s) has made or used the invention described in the appended claims.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 13D depicts another cross-sectional side view of the proximal portion of the linear surgical stapler of FIG. 13A, proximal retraction of the firing assembly over the firing lockout member;

Figure 1:
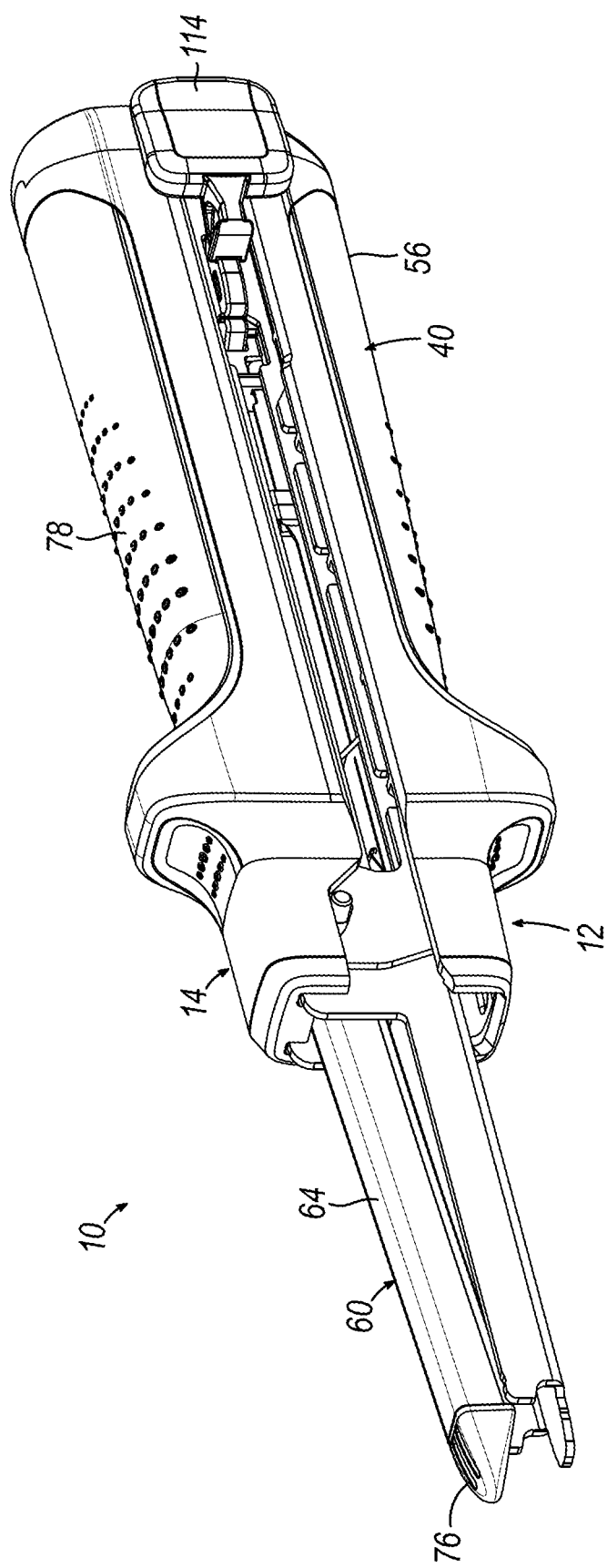
FIG. 1 depicts a perspective view of an illustrative linear surgical stapler, showing a cartridge half and an anvil half of the stapler coupled together with a clamp lever of the cartridge half in a fully closed position.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

For clarity of disclosure, the terms "proximal" and "distal" are defined herein relative to a surgeon, or other operator, grasping a surgical instrument having a distal surgical end effector. The term "proximal" refers to the position of an element arranged closer to the surgeon, and the term "distal" refers to the position of an element arranged closer to the surgical end effector of the surgical instrument and further away from the surgeon. Moreover, to the extent that spatial terms such as "upper," "lower," "vertical," "horizontal," or the like are used herein with reference to the drawings, it will be appreciated that such terms are used for illustrative description purposes only and are not intended to be limiting or absolute. In that regard, it will be understood that surgical instruments such as those disclosed herein may be used in a variety of orientations and positions not limited to those shown and described herein.

Furthermore, the terms "about" and "approximately" as used herein in connection with any numerical values or ranges indicate a suitable dimensional tolerance that allows the referenced feature(s) to function for its intended purpose as described herein.

I. Illustrative Linear Surgical Stapler

A. Overview of Linear Surgical Stapler

Figure 2:
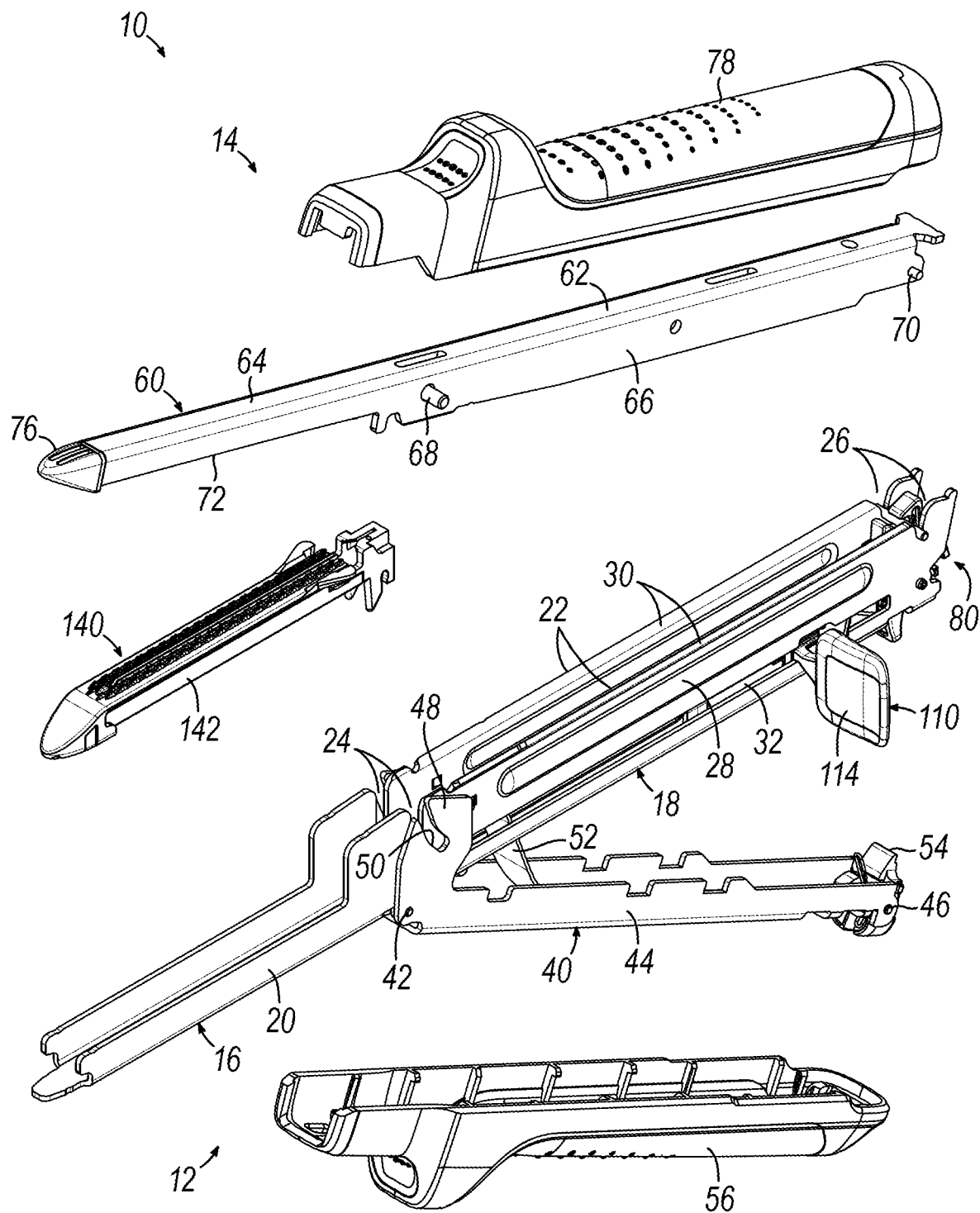
FIG. 2 depicts an exploded perspective view of the linear surgical stapler of FIG. 1, additionally showing a staple cartridge.

FIGS. 1-2 show an illustrative linear surgical stapler (10) (also referred to as a "linear cutter") suitable for use in a variety of cutting and stapling procedures, such as a gastrointestinal anastomosis procedure. Linear surgical stapler (10) includes a cartridge half (12) (also referred to as a "reload half") and an anvil half (14) configured to releasably couple together to clamp tissue therebetween for simultaneous cutting and stapling of the clamped tissue.

Cartridge half (12) includes a first elongate member in the form of an elongate cartridge channel (16) having a proximal frame portion (18) and a distal jaw portion (20). Proximal frame portion (18) slidably retains a firing assembly (110) and includes a laterally opposed pair of upright side flanges (22). Each side flange (22) includes a vertical slot (24) arranged at a distal end thereof, and a tapered notch (26) arranged at a proximal end thereof. An outwardly projecting stiffening rib (28) extends longitudinally between the distal slot (24) and proximal notch (26) of each side flange (22) and is configured to provide the side flange (22) with enhanced stiffness. An outwardly flared upper segment (30) defines an upper edge of a proximal portion of each side flange (22) and is configured to facilitate receipt of anvil half (14) by cartridge half (12). Each side flange (22) further includes an elongate firing slot (32) extending longitudinally between proximal notch (26) and distal slot (24) along a lower side of side flange (22). Elongate firing slots (32) are configured to guide firing assembly (110) between proximal and distal positions. Firing assembly (110) is described in greater detail below in connection with FIG. 8.

Figure 4:
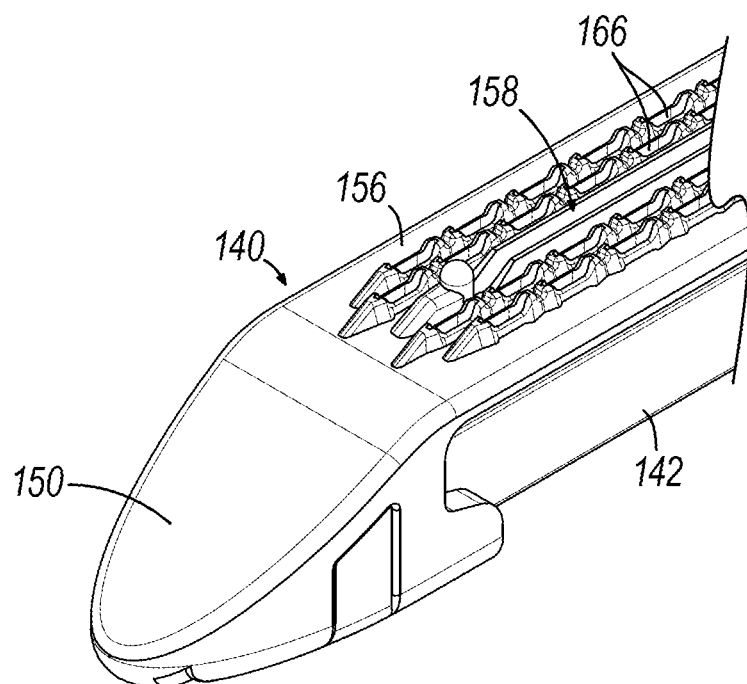
FIG. 4 depicts a perspective view of a distal end portion of the staple cartridge of FIG. 2.

Distal jaw portion (20) of cartridge channel (16) is configured to releasably receive a staple cartridge (140) (or "reload"). As shown in FIG. 4, staple cartridge (140) includes a cartridge body (142) having an upper side that defines a first stapling surface in the form of a deck (156) having a plurality of staple openings (166) that house a plurality of staples (not shown) and corresponding staple drivers (not shown).

Cartridge half (12) further includes a clamp member in the form of a clamp lever (40) (also referred to as a "clamp arm" or "latch lever") pivotably coupled to cartridge channel (16) with a clamp lever pivot pin (42), which is arranged in approximate alignment with distal slots (24) of cartridge channel side flanges (22). Clamp lever (40) includes an elongate lever arm (44) having a free proximal end (46) and a distal end that is pivotably coupled to a lower portion of cartridge channel (16) with pivot pin (42). A pair of opposed jaws (48) extend distally from the distal end of lever arm (44) alongside cartridge channel side flanges (22). Each jaw (48) includes a curved slot (50) having a closed proximal end and an open distal end configured to receive a latch pin (68) of anvil half (14), as described below.

Figure 9A:
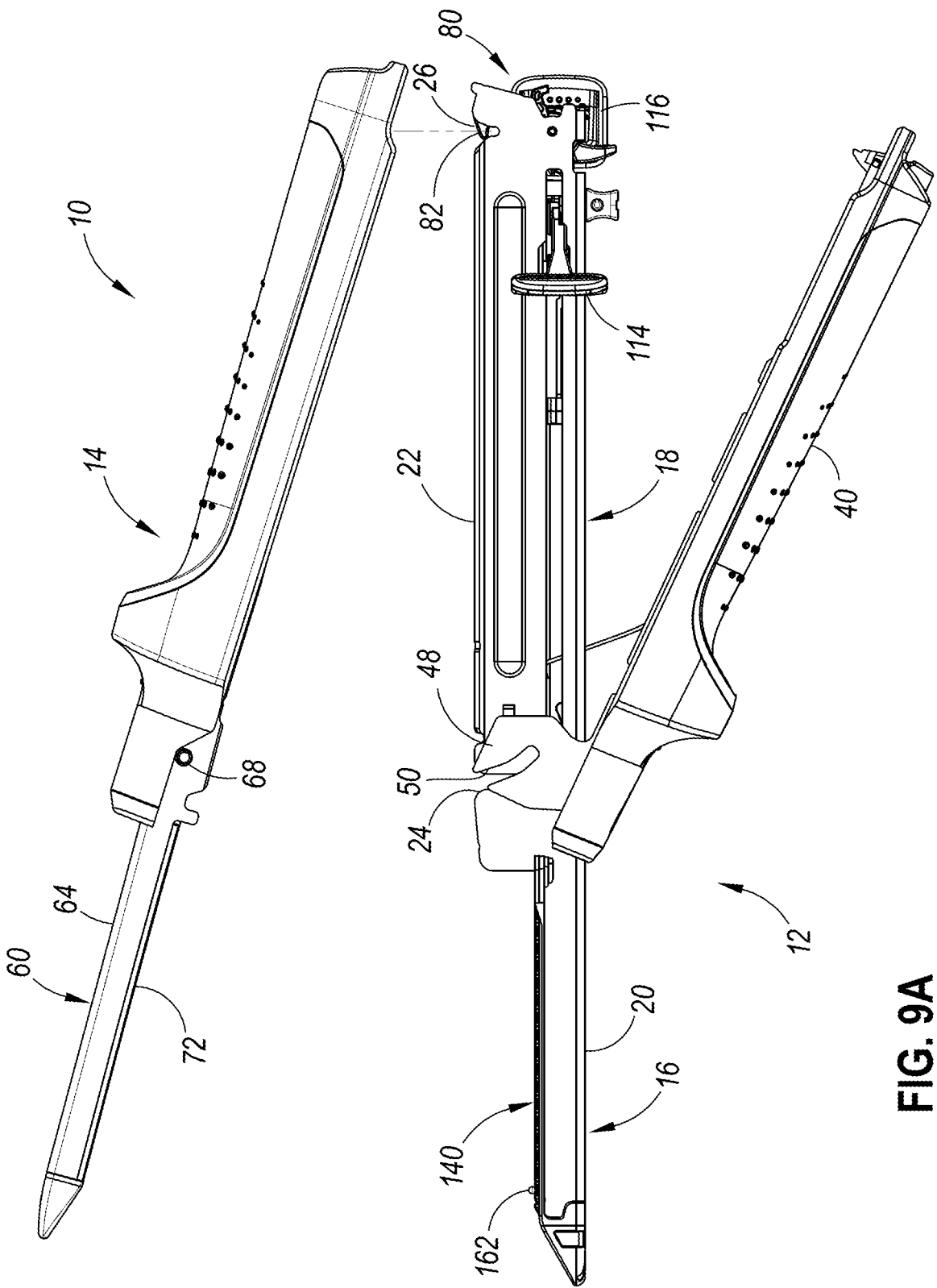
FIG. 9A depicts a side elevational view of the linear surgical stapler of FIG. 1, showing the stapler halves separated from one another with the clamp lever in the open position.
Figure 9B:
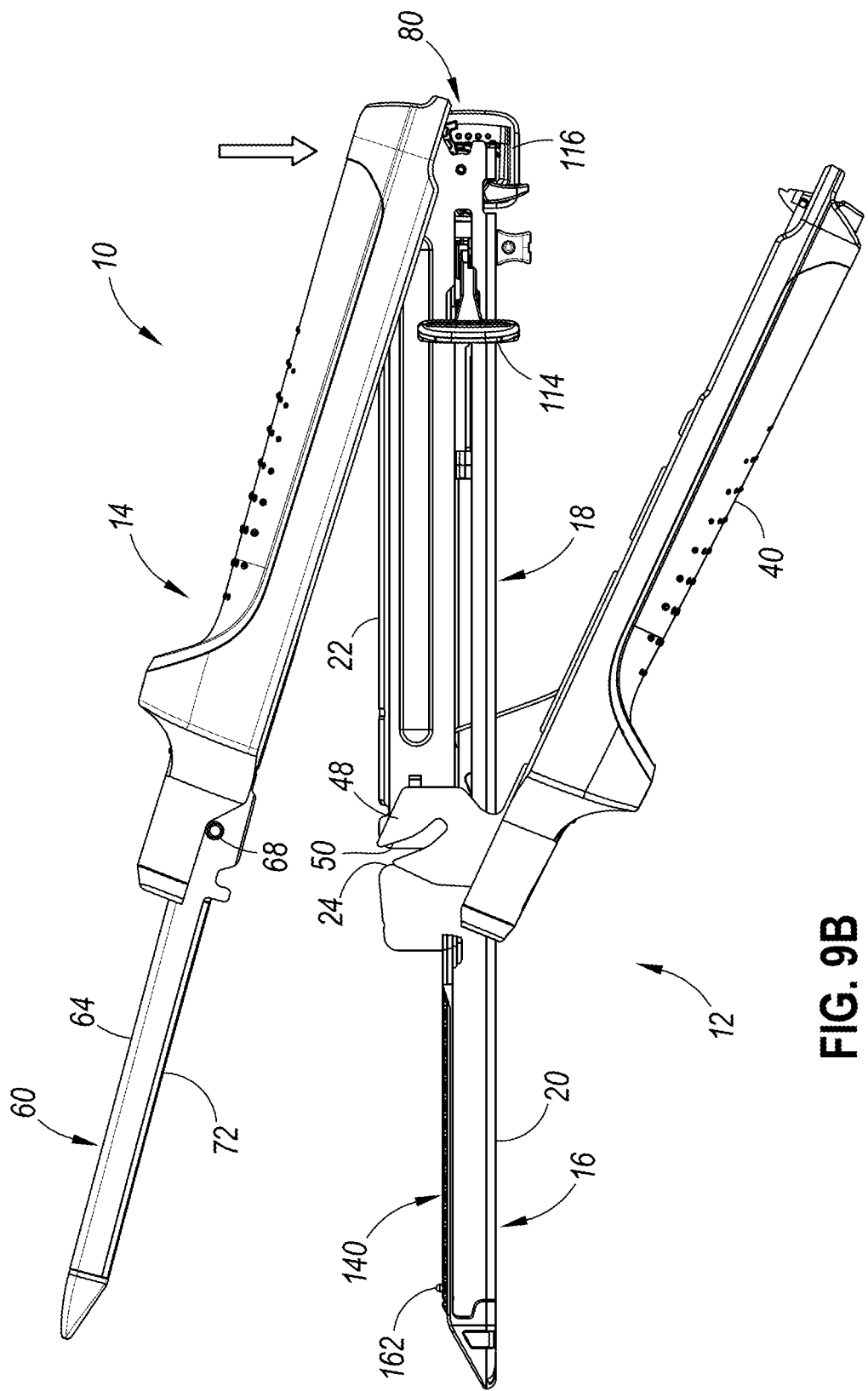
FIG. 9B depicts a side elevational view of the linear surgical stapler of FIG. 1, showing proximal ends of the stapler halves coupled together while the clamp lever is in the open position to provide the stapler in a "hang-open" state.
Figure 9C:
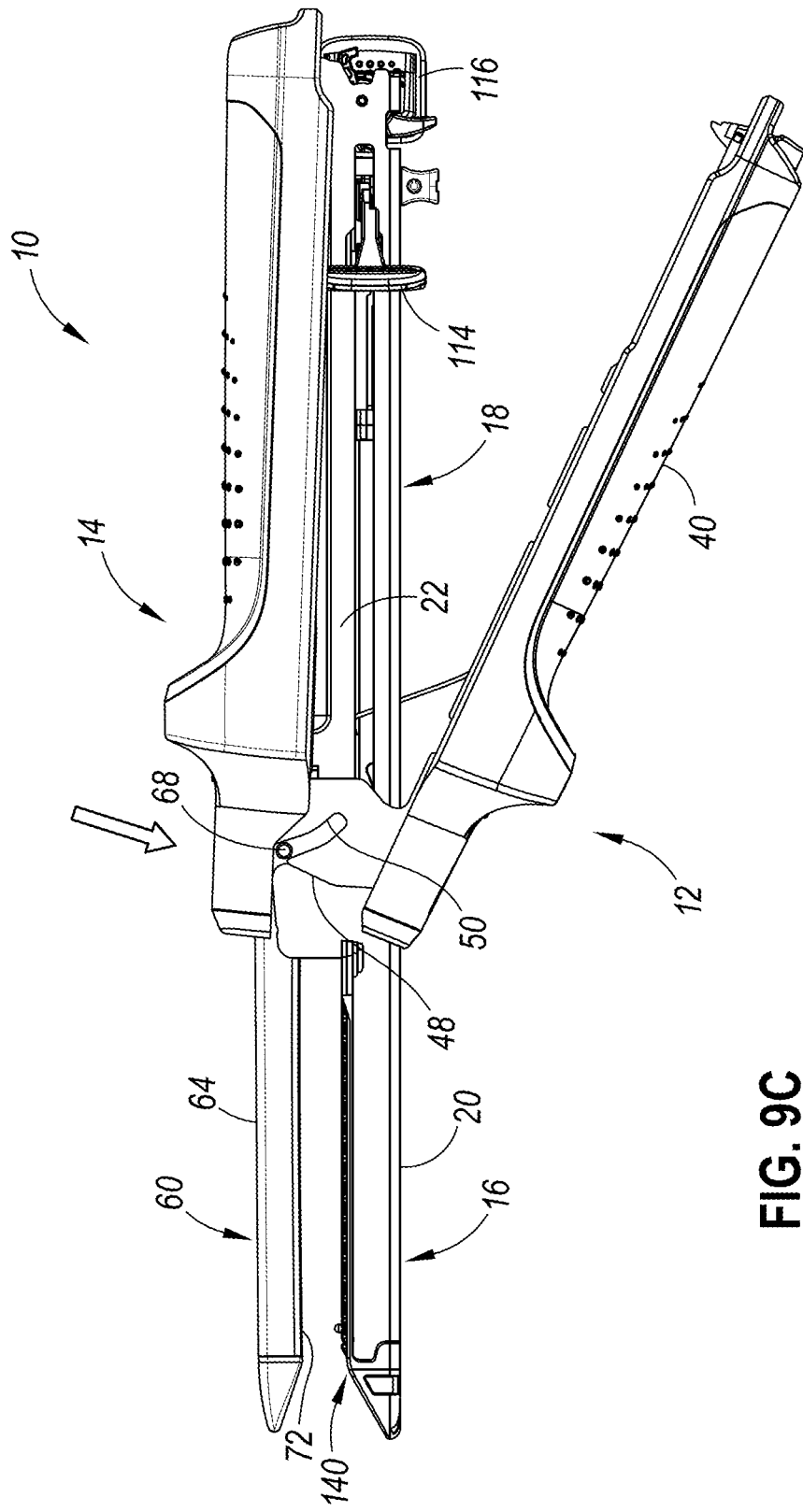
FIG. 9C depicts a side elevational view of the linear surgical stapler of FIG. 1, showing distal portions of the stapler halves having been approximated so that a distal pin of the anvil half is received by clamp lever jaws of the cartridge half.
Figure 9D:
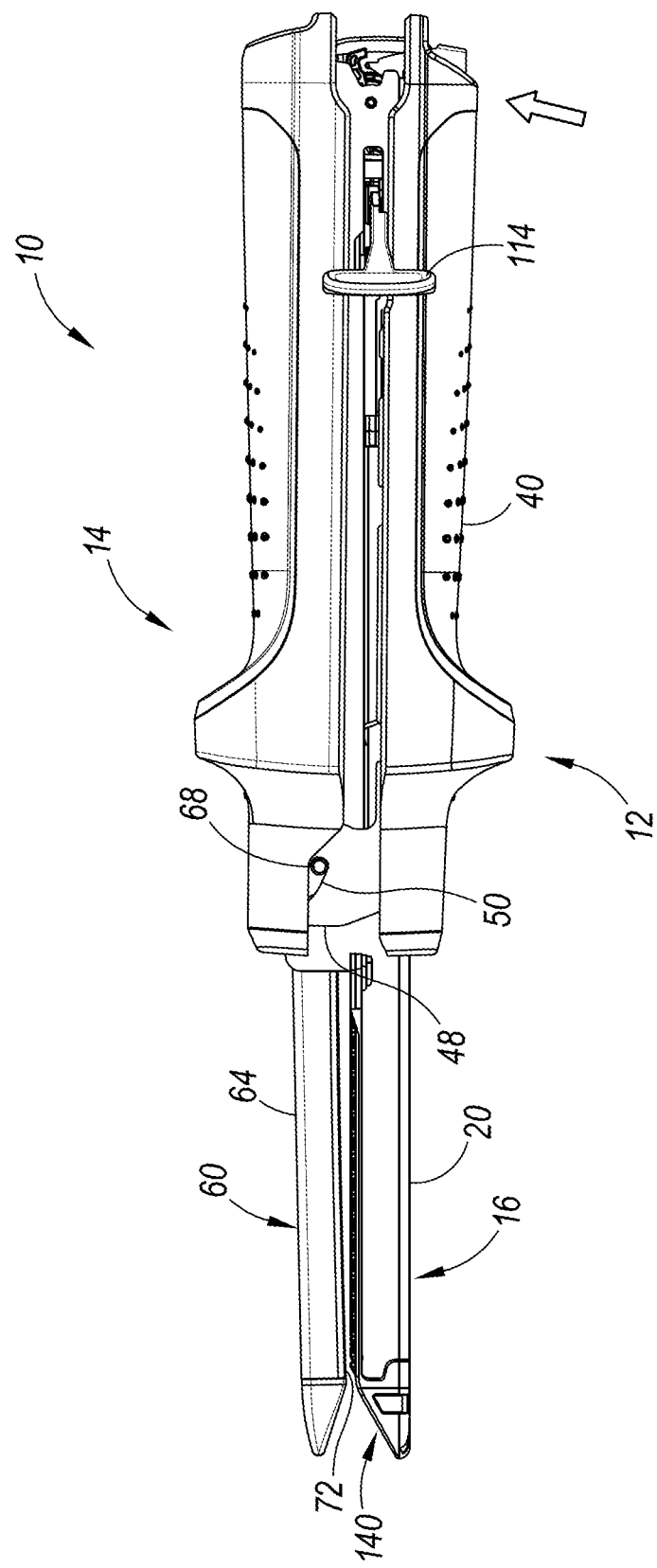
FIG. 9D depicts a side elevational view of the linear surgical stapler of FIG. 1, showing closure of the clamp lever to fully clamp the stapler halves together.

Clamp lever (40) is operable to pivot relative to cartridge channel (16) between an open position in which proximal end (46) of lever arm (44) is spaced from cartridge channel frame portion (18) as shown in FIGS. 9A-9C described below, and a closed position in which proximal end (46) confronts cartridge channel frame portion (18) as shown in FIG. 9D described below. Actuation of clamp lever (40) from the open position to the closed position operates to capture the opposed lateral ends of latch pin (68) within clamp lever jaw slots (50), and thereby clamp anvil half (14) against cartridge half (12), as shown and described below in connection with FIGS. 9C-9D. In that regard, the curvature of each jaw slot (50) defines respective upper and lower camming surfaces configured to engage and draw the respective lateral end of latch pin (68) toward cartridge channel (16) as clamp lever (40) is pivotably closed. A resilient member shown in the form of a leaf spring (52) biases lever arm (44) toward the open position. Accordingly, leaf spring (52) promotes disengagement of clamp lever jaws (48) from anvil half latch pin (68) upon initial advancement of clamp lever (40) from the closed position toward the open position.

As best shown in FIG. 2, clamp lever (40) further includes a latch member (54) arranged at proximal end (46) of lever arm (44). Clamp lever latch member (54) is configured to resiliently and releasably engage a proximal end of cartridge channel frame portion (18) and thereby releasably retain clamp lever (40) in the closed position, for instance while stapler (10) is being fired. Clamp lever latch member (54) may be further configured in accordance with the teachings of U.S. Pat. No. 11,278,285, entitled "Clamping Assembly for Linear Surgical Stapler," issued Mar. 22, 2022, the disclosure of which is incorporated by reference herein.

Anvil half (14) of linear surgical stapler (10) includes a second elongate member in the form of an elongate anvil channel (60) having a proximal frame portion (62) and a distal jaw portion (64). Proximal frame portion (62) includes a laterally opposed pair of upright side flanges (66) that are configured to be received between cartridge channel side flanges (22) when anvil half (14) is coupled with cartridge half (12). A distal latch projection in the form of latch pin (68) extends laterally through the distal ends of anvil channel side flanges (66), and a proximal pivot projection in the form of a proximal pin (70) extends laterally through the proximal ends of anvil channel side flanges (66). Anvil half pins (68, 70) are configured to facilitate coupling of anvil half (14) with cartridge half (12), as described below.

Figure 3:
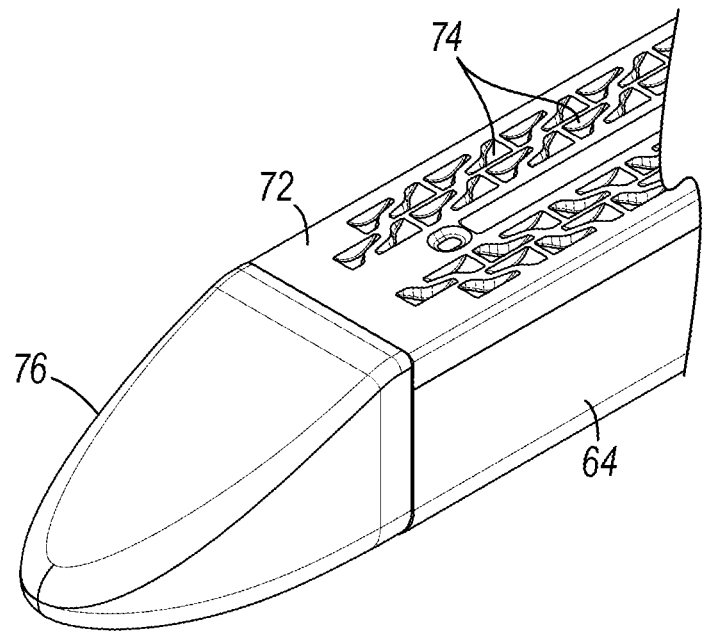
FIG. 3 depicts a perspective view of a distal end portion of the anvil half of the linear surgical stapler of FIG. 1.

As shown in FIGS. 2 and 3, distal jaw portion (64) of anvil half (14) supports an anvil plate (72) that defines a second stapling surface in the form of an anvil surface having a plurality of staple forming pockets (74) configured to deform legs of staples ejected by staple cartridge (140) when stapler (10) is fired. Staple forming pockets (74) of the present example may be formed via a coining process and are configured to form each staple of staple cartridge (140) with a three-dimensional shape in which the legs of each formed staple are laterally offset from one another so as to provide the formed staple with a non-planar shape, for example as disclosed in U.S. Pat. No. 11,229,433, entitled "Linear Surgical Stapler," issued Jan. 25, 2022, the disclosure of which is incorporated by reference herein. Anvil channel (60), anvil plate (72), and staple forming pockets (74) may be formed in one or more of the manners disclosed in U.S. Pat. Nos. 11,229,433; 11,045,193, entitled "Anvil Assembly for Linear Surgical Stapler," issued Jun. 29, 2021; and/or U.S. Pub. No. 2022/0142641, entitled "System and Method for Forming Pockets in Anvil of Surgical Stapler," published May 12, 2022, issued as U.S. Pat. No. 12,016,555 on Jun. 25, 2024, the disclosures of which are incorporated by reference herein. For instance, distal jaw portion (64) of anvil half (14) may be pre-formed with a curvature along its length that accommodates deflection of distal jaw portion (64) and anvil plate (72) when stapler halves (12, 14) are clamped together by clamp lever (40). Distal jaw portion (64) of anvil half (14) additionally supports an anvil insert (76). In some versions, the anvil insert (76) can be removable from the distal jaw portion (76) and replaced with a different anvil insert (76). In some versions, anvil insert (76) may be selectively extendable relative to distal jaw portion (64) in accordance with the teachings of U.S. Pat. No. 11,033,266, entitled "Decoupling Mechanism for Linear Surgical Stapler," issued Jun. 15, 2021, the disclosure of which is incorporated by reference herein.

As shown in FIG. 2, linear surgical stapler (10) further includes a pair of shrouds (56, 78) that cover select portions of stapler (10) and promote effective grip and manipulation of stapler (10) by an operator during use. In the present example, a clamp lever shroud (56) is affixed to and covers an outwardly facing side of clamp lever (40) such that clamp lever shroud (56) is configured to pivot with clamp lever (40) relative to cartridge channel (16). Additionally, an anvil shroud (78) is affixed to and covers an outwardly facing side of anvil channel (60). In some versions, anvil shroud (78) may be coupled with anvil channel (60) via interaction between pins (68, 70) and one or more tabs, ribs, or other structures that are disposed within an interior of anvil shroud (78) and include an opening, slot, keyhole, or other feature configured to receive a respective one of pins (68, 70). By way of example only, shrouds (56, 78) may be affixed using one or more of the teachings of U.S. Pat. No. 11,278,285, incorporated by reference above. In other versions, shrouds (56, 78) may be coupled with clamp lever (40) and anvil channel (60) in a variety of other suitable manners readily apparent to those of ordinary skill in the art in view of the teachings herein.

As shown best in FIGS. 2 and 5-7, a proximal end of cartridge half (12) includes a retaining assembly (80) configured to releasably retain portions of anvil half (14) and firing assembly (110). Retaining assembly (80) of the present example includes a first movable retaining member in the form of an anvil latch member (82) and a second movable retaining member in the form of a detent member (84) (each also referred to as a "rotatable body"). Anvil latch member (82) and detent member (84) are rotatably coupled with a proximal end of cartridge channel (16) via a laterally extending pin (85) arranged proximally of firing slots (32), and members (82, 84) are resiliently biased in opposite rotational directions by a resilient member in the form of a torsion spring (86) positioned between members (82, 84).

Anvil latch member (82) includes a central body (88), a latch finger (90) extending upwardly from central body (88), and a release button (92) extending downwardly from central body (88) though a base wall of proximal frame portion (18) of cartridge channel (16). An upper end of latch finger (90) tapers distally and is configured to releasably capture proximal anvil pin (70) of anvil half (14) with an angled latching surface (94) that overlies proximal anvil pin (70) once captured. Anvil latch member (82) further includes a pin ejection feature in the form of an angled projection (96) extending distally from a base portion of latch finger (90) and which defines an ejection cam ramp (98) that faces proximally toward latch finger (90).

Detent member (84) of proximal retaining assembly (80) includes a generally cylindrical central body (100), a distal finger (102) extending distally from central body (100), and a proximal hook (104) extending proximally from central body (100). Distal finger (102) is configured to releasably engage a proximal end of firing assembly (110) and thereby retain firing assembly (110) in a proximal home position. Proximal hook (104) is configured to overlie and capture an upper tip of clamp lever latch member (54) when clamp lever (40) is fully closed and firing assembly (110) is translated distally from its proximal home position, thereby preventing clamp lever (40) from opening during a firing stroke, for example as described in greater detail in U.S. Pat. No. 11,278,285, incorporated by reference above.

In use, with stapler halves (12, 14) coupled together at their proximal ends such that proximal anvil pin (70) is retained by anvil latch member (82), and with clamp lever (40) in the open position, distal actuation of lower release button (92) causes anvil latch member (82) to rotate about pin (85) such that ejection cam ramp (98) advances proximally to drive proximal anvil pin (70) upwardly out of proximal tapered notches (26) of cartridge channel (16). Cartridge half (12) of the present version further includes a stationary finger grip projection (106) that extends downwardly from a base wall of proximal frame portion (18) of cartridge channel (16) at a location distal to lower release button (92) and is configured to facilitate actuation of release button (92). In particular, a user may apply his or her thumb to a proximal side of release button (92) and one or more fingers to a distal side of finger grip projection (106), and then squeeze release button (92) distally toward stationary finger grip projection (106) to rotate latch finger (90) out of engagement with proximal anvil pin (70) and eject pin (70) upwardly from cartridge channel (16) with ejection cam ramp (98).

Retaining assembly (80) and related components of cartridge half (12) may be further configured and operable in accordance with one or more teachings of U.S. Pat. No. 10,898,187, entitled "Firing System for Linear Surgical Stapler," issued Jan. 26, 2021, the disclosure of which is incorporated by reference herein; and/or U.S. Pat. No. 11,033,266, incorporated by reference above.

Figure 8:
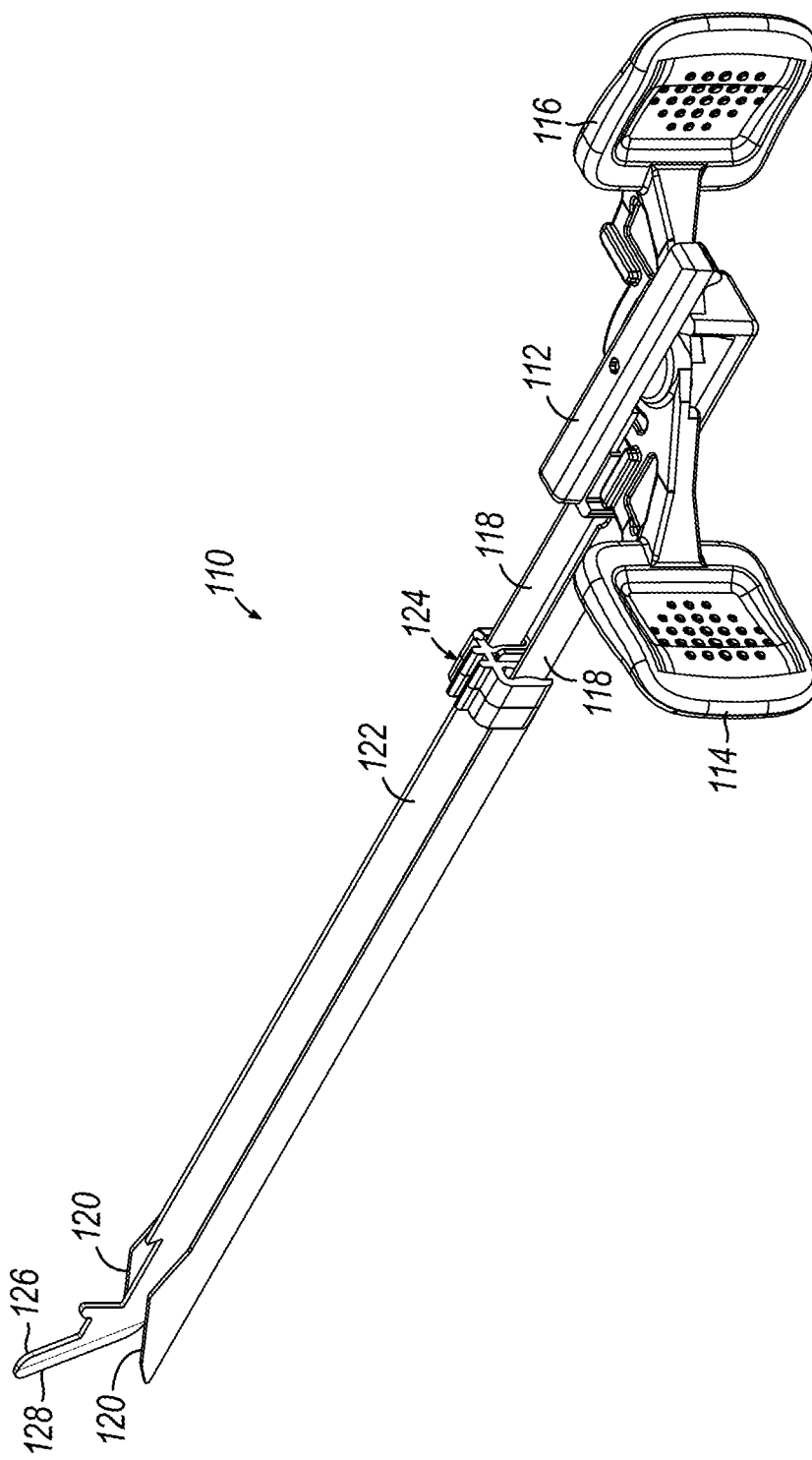
FIG. 8 depicts a perspective view of the firing assembly of FIG. 5.

As shown in FIG. 8, firing assembly (110) of cartridge half (12) includes a slidable body in the form of a slide block (112), a pair of actuators (114, 116) (or "firing knobs") pivotably coupled to slide block (112), and a set of elongate beams (118, 122) extending distally from slide block (112). A pair of side beams (118) are coupled at their proximal ends to a distal end of slide block (112) and terminate distally in a pair of cam ramps (120). Cam ramps (120) are configured to engage the undersides of the staple drivers (not shown) housed within staple cartridge (140) and actuate the staple drivers (not shown) upwardly to thereby drive (or "fire") staples from cartridge (130) into tissue clamped between staple cartridge (140) and anvil plate (72). A center beam (122) is coupled with side beams (118) via a bridge member (124) (or "knife block") spaced distally from slide block (112). Center beam (122) terminates distally in a distally angled knife member (126) having a distal cutting edge (128) configured to cut tissue clamped between the distal portions of stapler halves (12, 14).

Each actuator (114, 116) of firing assembly (110) is configured and rotatable relative to slide block (112) between a deployed position and a retracted position such that only one actuator (114, 116) may be deployed at a time, for example as disclosed in U.S. Pat. No. 10,898,187, incorporated by reference above. In the deployed position, an actuator (114, 116) may be driven distally by an operator to actuate firing assembly (110) distally through stapler (10) and thereby simultaneously cut and staple tissue clamped between stapler halves (12, 14).

B. Illustrative Use of Linear Surgical Stapler

Figure 5:
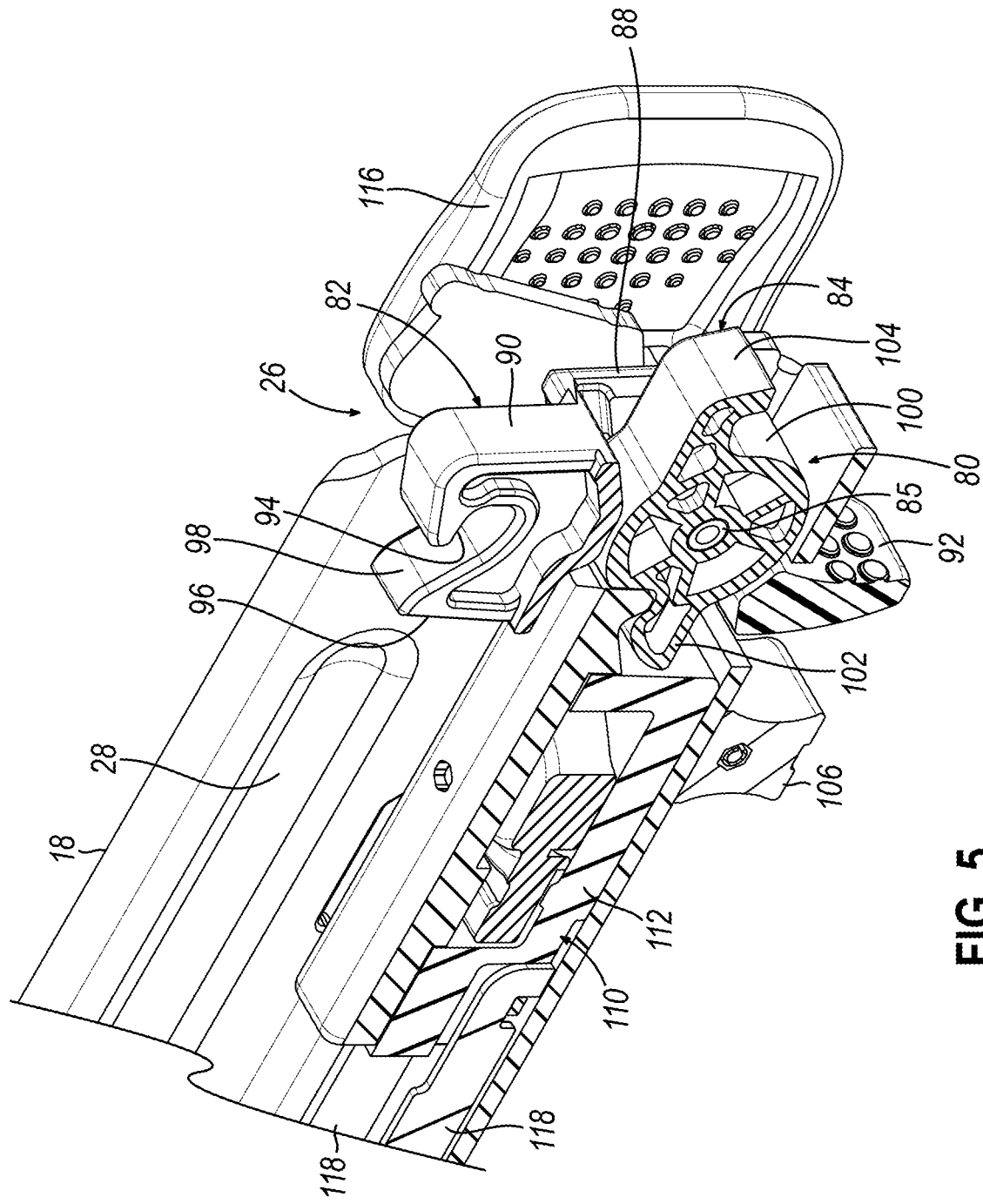
FIG. 5 depicts a cross-sectional perspective view of a proximal portion of the cartridge half of the linear surgical stapler of FIG. 1 with the clamp lever in an open position to reveal details of a firing assembly and a retaining assembly of the cartridge half.
Figure 6:
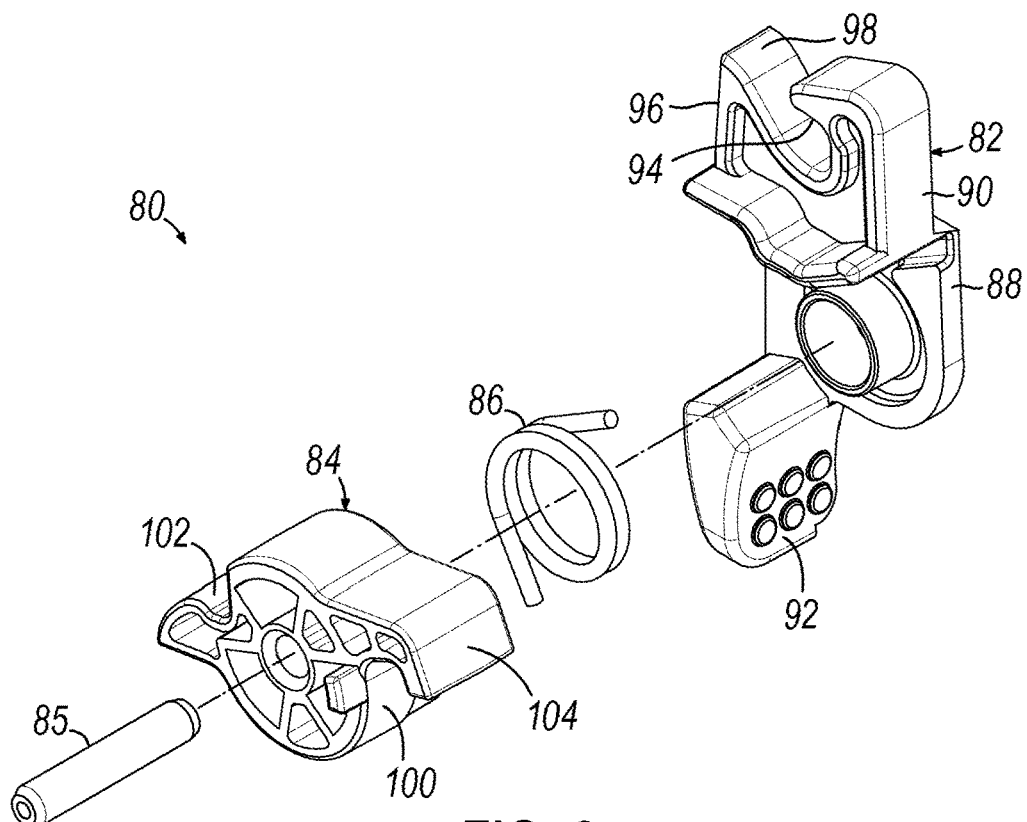
FIG. 6 depicts an exploded perspective view of the retaining assembly of FIG. 5.
Figure 7:
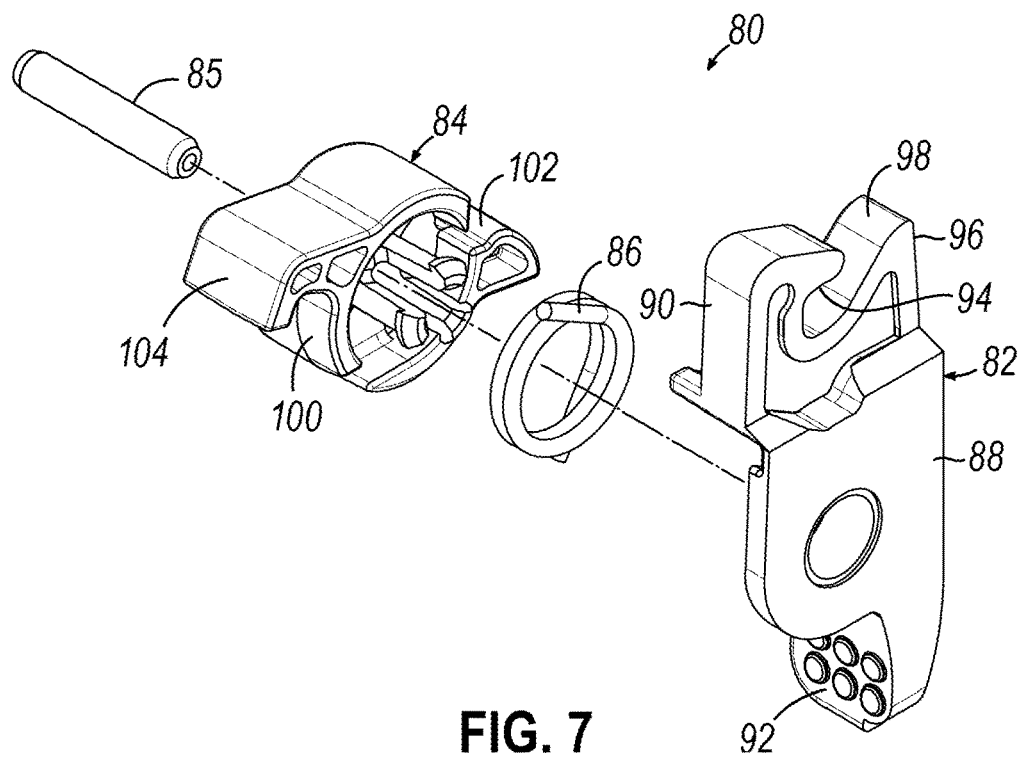
FIG. 7 depicts another exploded perspective view of the retaining assembly of FIG. 5.

FIGS. 9A-9E show illustrative coupling of stapler halves (12, 14) and subsequent firing of assembled stapler (10) during a surgical procedure. As shown in FIG. 9A, clamp lever (40) of cartridge half (12) is provided in the open position so that jaw slots (50) align with vertical slots (24) of cartridge channel side flanges (22). Additionally, firing assembly (110) is maintained in its proximal home position by detent member (84) of retaining assembly (80), as shown in FIG. 5 and described above. At this stage, a section of tissue (not shown) to be stapled and cut may be positioned over the top of staple cartridge (140) disposed in distal jaw portion (20) of cartridge half (12). Alternatively, the tissue may be positioned over staple cartridge (140) following coupling of the proximal ends of stapler halves (12, 14), described below.

As shown in FIGS. 9A-9B, the proximal ends of stapler halves (12, 14) are aligned with one another, and proximal anvil pin (70) is directed downwardly into proximal tapered notches (26) of cartridge channel (16) to engage latch finger (90) of anvil latch member (82). This engagement forces anvil latch member (82) to resiliently rotate clockwise, thus enabling latch finger (90) to capture anvil pin (70) and thereby releasably couple together the proximal ends of stapler halves (12, 14), as seen in FIG. 9B. With clamp lever (40) still in the open position as shown in FIG. 9B, stapler (10) is provided in a "hang-open" state such that stapler (10) may be held single-handedly by anvil half (14) while cartridge half (12) remains coupled to anvil half (14). As shown in FIG. 9C, and with clamp lever (40) remaining in the open position, anvil half (14) is rotated toward anvil half (14) about proximal anvil pin (70) so that distal latch pin (68) of anvil half (14) is received into vertical slots (24) of cartridge channel side flanges (22) and jaw slots (50) of clamp lever (40). Distal jaw portions (20, 64) of stapler halves (12, 14) are now in a partially approximated state such that tissue received therebetween may be finally adjusted before clamping.

As shown in FIG. 9D, clamp lever (40) is closed to draw anvil latch pin (68) against the closed proximal ends of jaw slots (50) and thereby fully clamp anvil half (14) against cartridge half (12), with tissue (not shown) clamped between the stapling surfaces defined by staple cartridge (140) and anvil plate (72). A slight transverse gap is defined between staple cartridge (140) and anvil plate (72) by a tissue gap post (162) of staple cartridge (140), thus accommodating the tissue therebetween with a predetermined degree of tissue compression. As shown in FIGS. 9A and 9B, tissue gap post (162) is disposed at a distal end of staple cartridge (140) and is configured to contact a distal end of anvil plate (72) when stapler (10) is in the fully clamped state shown in FIG. 9D. In response to clamp lever (40) reaching the fully closed position, clamp lever latch member (54) may rotate to capture a proximal end of a base wall of cartridge channel (16) and thereby assume a latched state in which clamp lever latch member (54) maintains clamp lever (40) in the closed position.

Figure 9E:
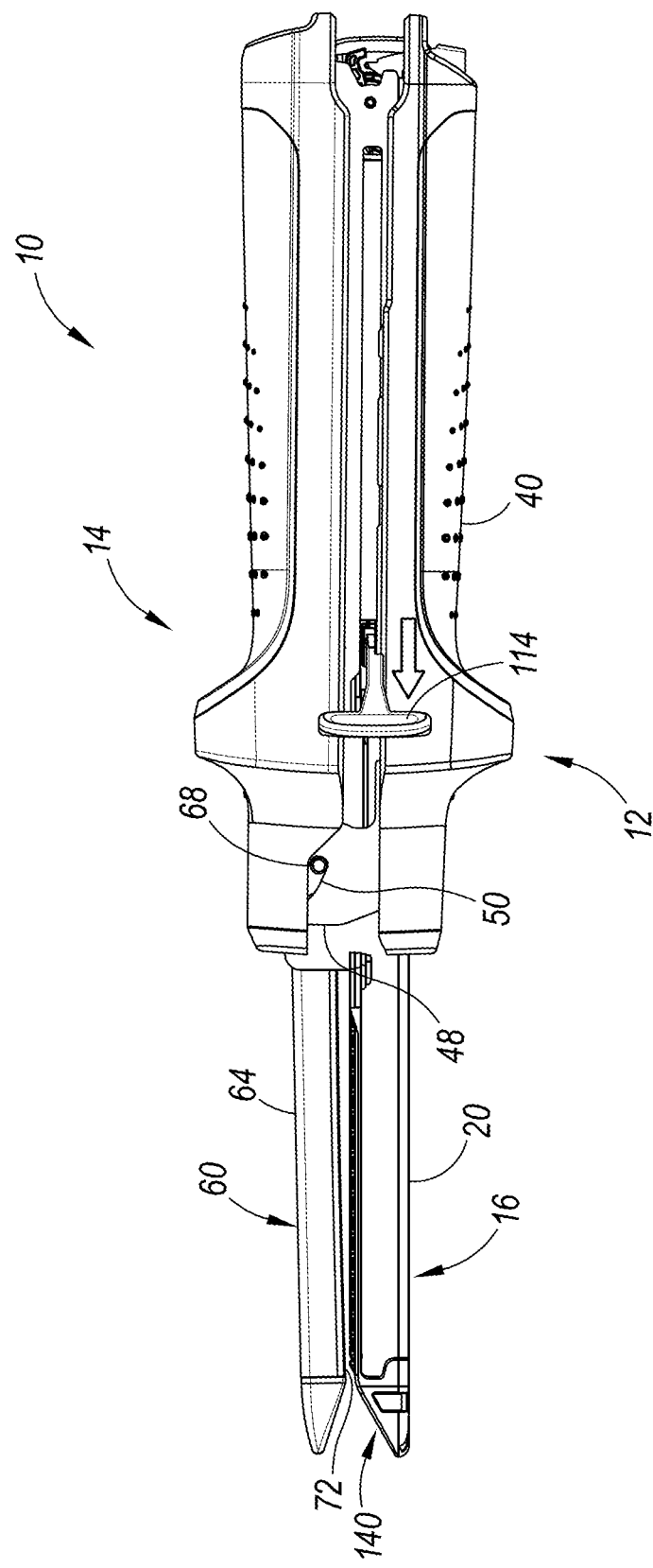
FIG. 9E depicts a side elevational view of the linear surgical stapler of FIG. 1, showing distal actuation of the firing assembly while the stapler halves are in the fully clamped state.

As shown in FIG. 9E, upon reaching the fully clamped state, stapler (10) may be fired by driving a deployed actuator (114, 116) of firing assembly (110) distally along proximal frame portion (18) of cartridge half (12). This action causes elongate beams (118, 122) of firing assembly (110) to translate distally through corresponding channels formed in staple cartridge (140) and thereby fire staples into the clamped tissue via cam ramps (120) and the staple drivers, and simultaneously cut the clamped tissue with knife member (126). Following completion of the firing stroke, firing assembly (110) is returned to its proximal home position via the actuator (114, 116). Clamp lever latch member (54) may then be depressed to release the proximal end of clamp lever (40) from cartridge channel (16), thus permitting clamp lever (40) to be re-opened. Then, release button (92) of retaining assembly (80) may be depressed to release anvil half (14) from cartridge half (12) so that stapler halves (12, 14) may be separated from one another, thereby releasing the newly stapled and severed tissue. Stapler (10) may be further configured and operable in accordance with the teachings of U.S. patent application Ser. No. 18/316,635, entitled "Linear Surgical Stapler," filed on May 12, 2023, published as U.S. Pat. Pub. No. 2023/0397911 on Dec. 14, 2023, the disclosure of which is incorporated by reference herein, in its entity. Additionally, it will be understood that in some versions, stapler (10) may include additional features to promote decoupling of stapler halves (12, 14), for example as disclosed in U.S. Pat. No. 11,033,266, incorporated by reference above.

II. Illustrative Firing Lockouts that Require Full Deployment of a Firing Actuator As described above, firing assembly (110) of linear surgical stapler (10) is actuated distally through a firing stroke by one of firing actuators (114, 116) in a deployed position being driven by a user. To better protect against potential misuse of stapler (10) by a user, it may be desirable to equip stapler (10) with a firing lockout member that inhibits firing by a user unless one firing actuator (114, 116) is fully deployed. FIGS. 10-15B show illustrative versions of linear surgical staplers configured in such a manner. It should be understood that the features discussed below may be readily combined with the features of stapler (10). To this end, like numbers below indicate like features described above in greater detail.

A. Leaf Spring for Selectively Inhibiting Firing of Firing Assembly

Figure 10:
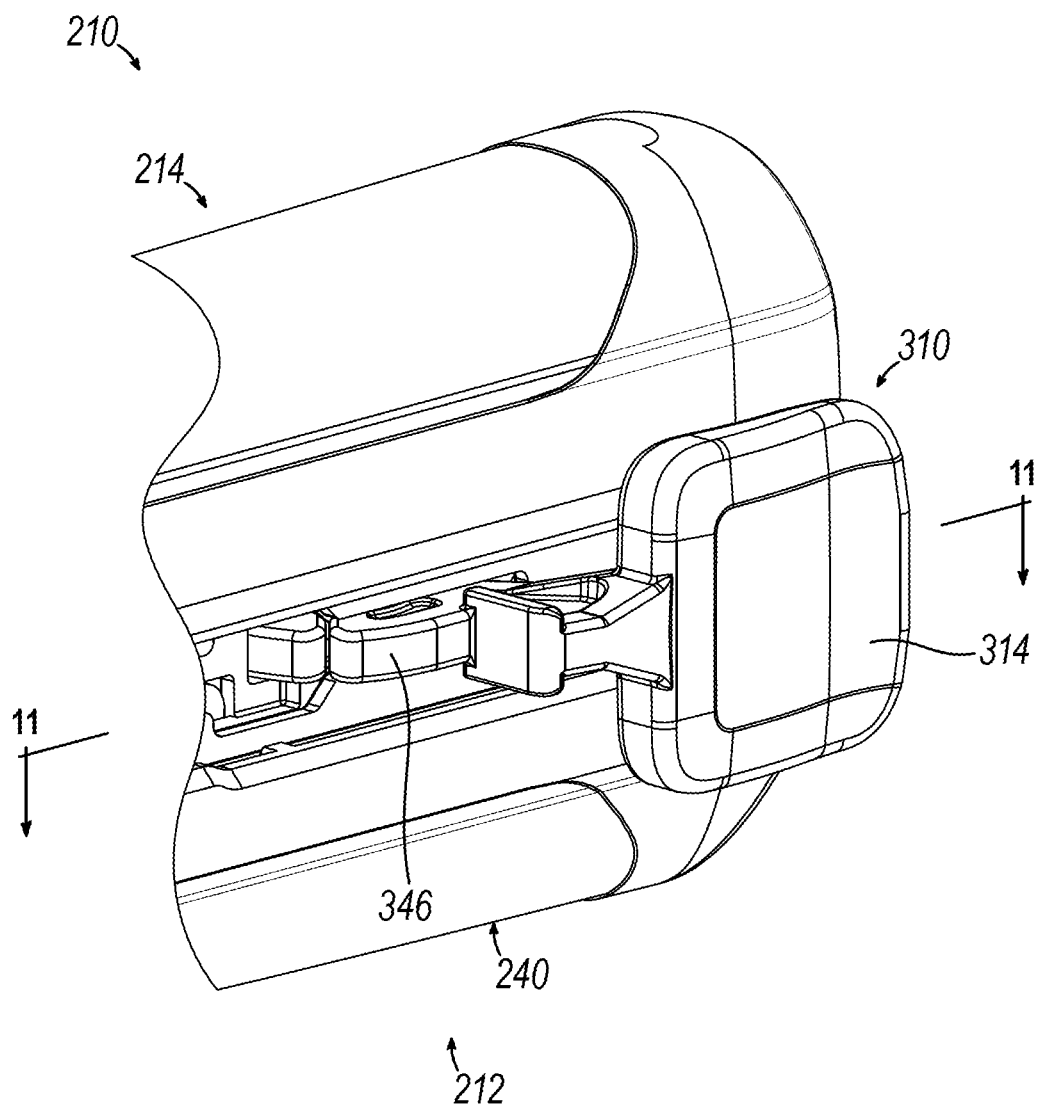
FIG. 10 depicts a perspective view of a proximal portion of an illustrative linear surgical stapler having a firing lockout member, showing the firing assembly in a proximal home position and a firing actuator of the firing assembly in a retracted position.
Figure 11:
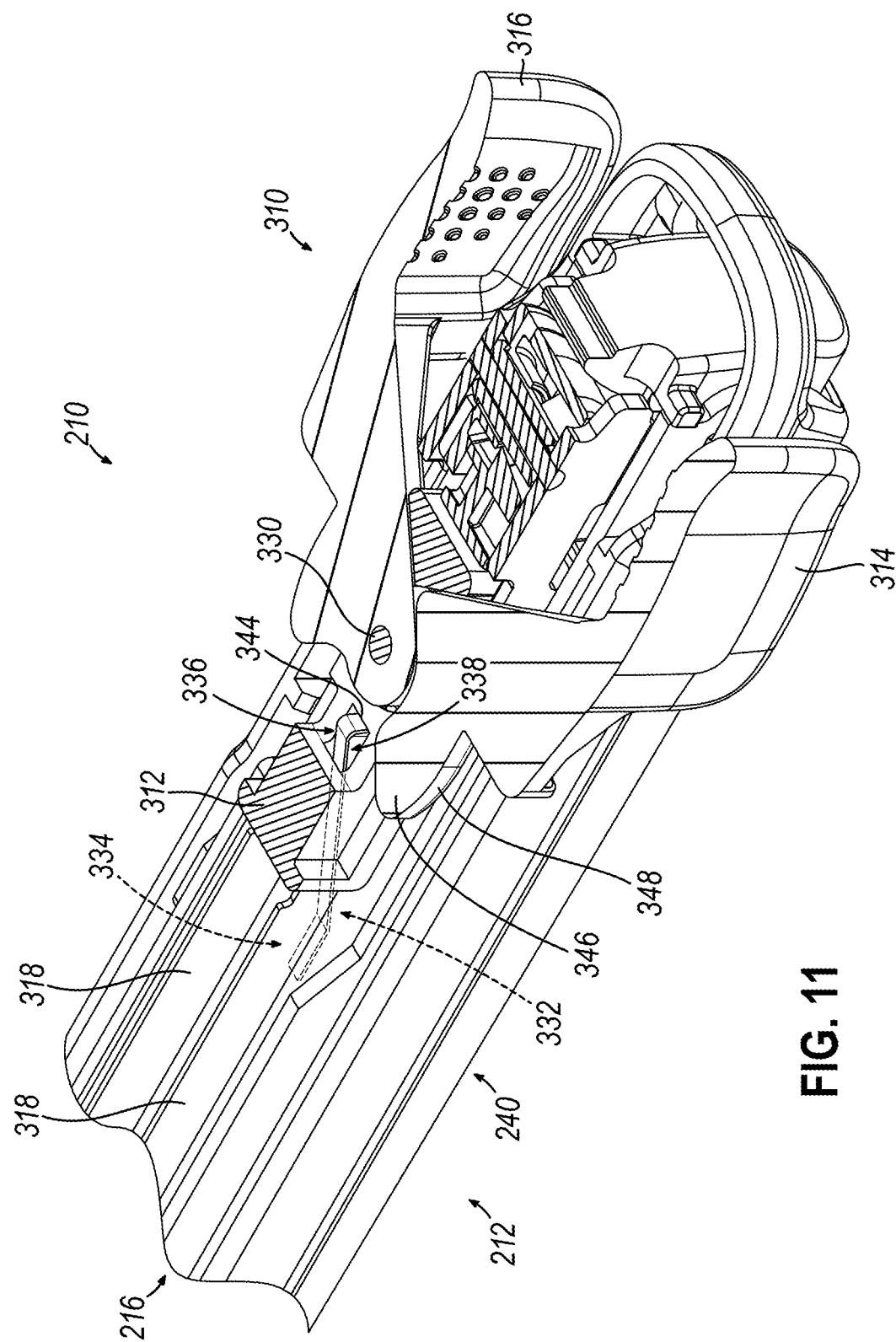
FIG. 11 depicts a cross-sectional perspective view of a proximal portion of the linear surgical stapler of FIG. 10, taken along line 11-11, showing the firing assembly in the proximal home position with both firing actuators in retracted positions such that the firing lockout member is in an engaged position that inhibits distal actuation of the firing assembly through a firing stroke.

FIGS. 10-12C show another illustrative stapler (210) that is generally similar to stapler (10) described above except as otherwise described below. As illustrated in FIG. 10, stapler (210) includes a cartridge half (212) (or "reload half") and an anvil half (214) configured to releasably couple together to clamp tissue therebetween for simultaneous cutting and stapling of the clamped tissue. As illustrated in FIG. 11, cartridge half (212) includes a clamp member in the form of a clamp lever (240) pivotably coupled to a cartridge channel (216). Clamp lever (240) is actuatable by a user from an opened position to a closed position to approximate cartridge half (212) and anvil half (214) and thereby clamp tissue between distal jaw portions (e.g., 20, 64). Cartridge channel (216) includes a pair of elongate beams (318). A firing assembly (310) is provided as part of cartridge half (212) and is actuatable by a user through a firing stroke from a home position (shown in FIGS. 10 and 11) to a fired position (e.g., shown in FIG. 9E) to fire a stapling assembly on the clamped tissue. Firing assembly (310) includes a slidable body in the form of a slide block (312) and a pair of firing actuators (314, 316) pivotably coupled to slide block (312). Elongate beams (318) extend distally from slide block (312) and accommodate sliding of the slide block (312) such that slide block (312) and firing actuators (314, 316) are configured to translate together relative to elongate beams (318) between the home position and the fired position. In one example, the home position comprises a proximal position and the fired position comprises a distal position such that the firing assembly (310) is actuatable distally by one of the firing actuators (314, 316) from the home position to the fired position to fire the stapler assembly.

Each firing actuator (314, 316) is pivotably coupled with slide block (312) by a pin (330) that defines a pivot axis P1 for firing actuators (314, 316) that extends transversely to the direction of travel of the slide block (312). Each firing actuator (314, 316) is pivotable about pin (330), and relative to slide block (312) and to each other, between a retracted position (shown in FIG. 11) and a deployed position (e.g., 114 shown in FIG. 8). In one example, only one of the firing actuators (314, 316) is capable of being pivoted into the deployed position at a time. When either of the firing actuators (314, 316) are in the deployed position, the deployed firing actuator (314, 316) may be driven distally by an operator to actuate firing assembly (310) distally through stapler (210) to thereby simultaneously cut and staple tissue clamped between cartridge and anvil halves (212, 214). It is to be appreciated, that although firing actuators (314, 316) are described as being pivotable relative to the slide block (312), firing actuators (314, 316) can be configured for any suitable type of movement relative to the slide block (312) between a retracted position and a deployed position.

Figure 12A:
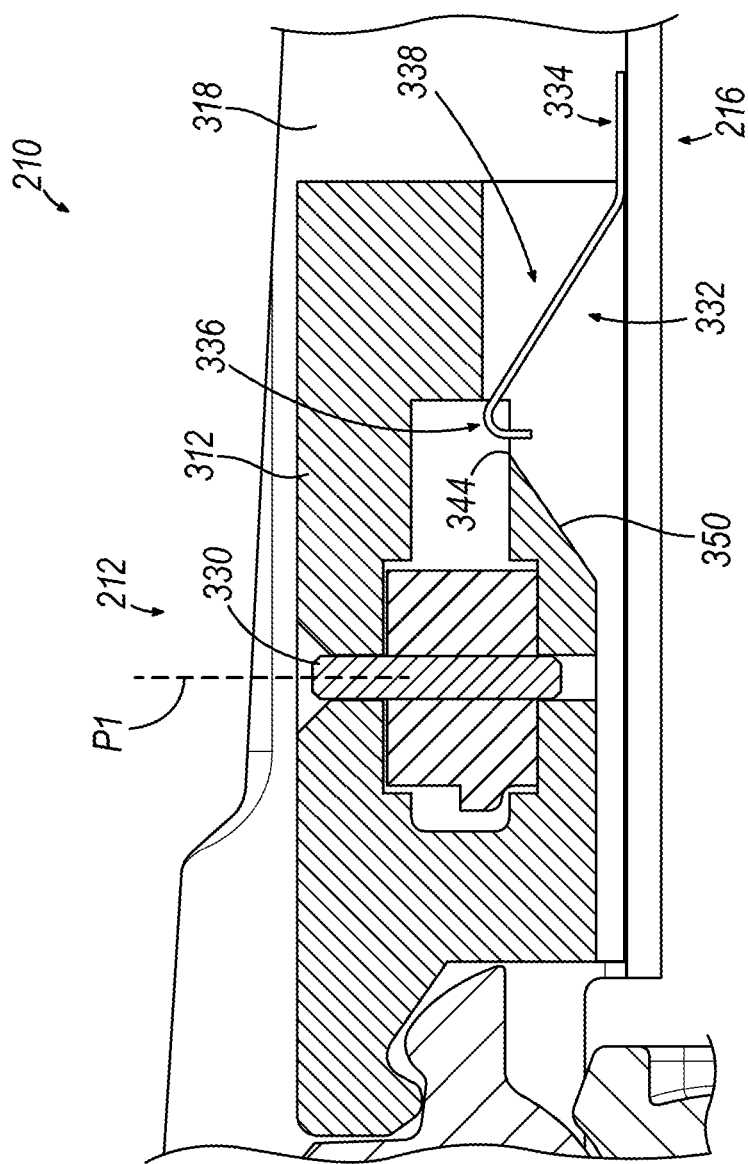
FIG. 12A depicts a cross-sectional side view of a proximal portion of the linear surgical stapler of FIG. 10, showing the firing lockout member in the engaged position while both firing actuators are in the retracted positions.
Figure 12B:
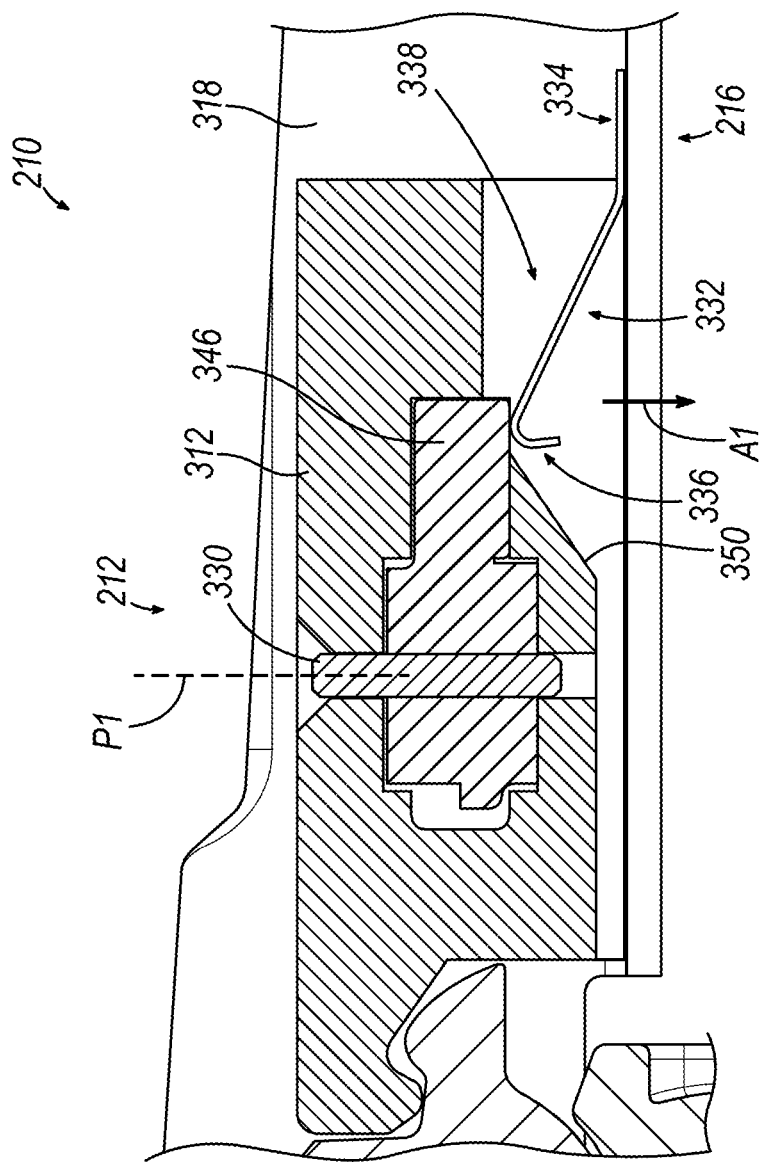
FIG. 12B depicts another cross-sectional side view of the proximal portion of the linear surgical stapler of FIG. 10, showing the firing lockout member moved to a disengaged position by a firing actuator in the deployed position.

As illustrated in FIGS. 11-12B, a firing lockout member in the form of a leaf spring (332) can be provided that is longitudinally fixed with respect to cartridge channel (216) and inhibits advancement of the firing assembly (310) into the fired position until one of the firing actuators (314, 316) is pivoted into the deployed position, as will be described in further detail below. The leaf spring (332) includes a distal end (334) that is coupled with cartridge channel (216) and is disposed between elongate beams (318). A proximal end (336) extends upwardly and distally from distal end (334) and selectively interfaces with slide block (312). Slide block (312) defines a channel (338) that accommodates proximal end (336) of leaf spring (332).

As illustrated in FIGS. 12A and 12B, proximal end (336) of leaf spring (332) is movable between an engaged position (FIG. 12A) and a disengaged position (FIG. 12B). When proximal end (336) is in the engaged position, as illustrated in FIG. 12A, it is disposed adjacent to a stop surface (344) disposed at a proximal end of channel (338). If firing assembly (310) is then urged from the home position toward the firing position, proximal end (336) contacts stop surface (344) to inhibit advancement of firing assembly (310) towards the firing position. When proximal end (336) is in the disengaged position, as illustrated in FIG. 12B, it is disposed beneath stop surface (344) and thus no longer inhibits firing of firing assembly (310) into the firing position.

The leaf spring (332) is configured to transition from the engaged position to the disengaged position in response to one of the firing actuators (314, 316) transitioning from the retracted position to the deployed position. Operation of firing actuator (314) will now be described to facilitate firing of firing assembly (310) but can be understood to be representative of the operation of firing actuator (316). Firing actuator (314) includes a finger (346) that includes a chamfered surface (348). Pivoting of firing actuator (314)

between the deployed and retracted position can move finger (346) and chamfered surface (348) into and out of engagement with proximal end (336) of leaf spring (332) to facilitate movement of distal end between the disengaged position and the engaged position. For example, as illustrated in FIGS. 11 and 12A, when firing actuator (314) is in the retracted position, finger (346) and chamfered surface (348) are spaced apart from proximal end (336) and channel (338) such that proximal end (336) is provided in the engaged position and into direct contact with stop surface (344) to inhibit sliding of slide block (312), and thus firing assembly (310), from the home position towards the firing position. When firing actuator (314) is then pivoted into the deployed position, finger (346) is correspondingly pivoted into position over proximal end (336). Such pivoting of finger (346) can cause chamfered surface (348) to engage proximal end (336) and correspondingly move proximal end (336) into the disengaged position (e.g., in the direction of arrow A1), as illustrated in FIG. 12B, which effectively releases proximal end (336) from direct contact with stop surface (344) to allow for firing of firing assembly (310) from the home position to the fired position. Proximal end (336) of leaf spring (332) is therefore configured to assume the disengaged position only when the firing actuator (314) is in the deployed position. As such, firing assembly (310) is prevented from firing, unless and until, firing actuator (314) is pivoted to the retracted position which can prevent inadvertent firing of firing assembly (310) until firing actuator (314) is properly provided in the deployed position.

Figure 12C:
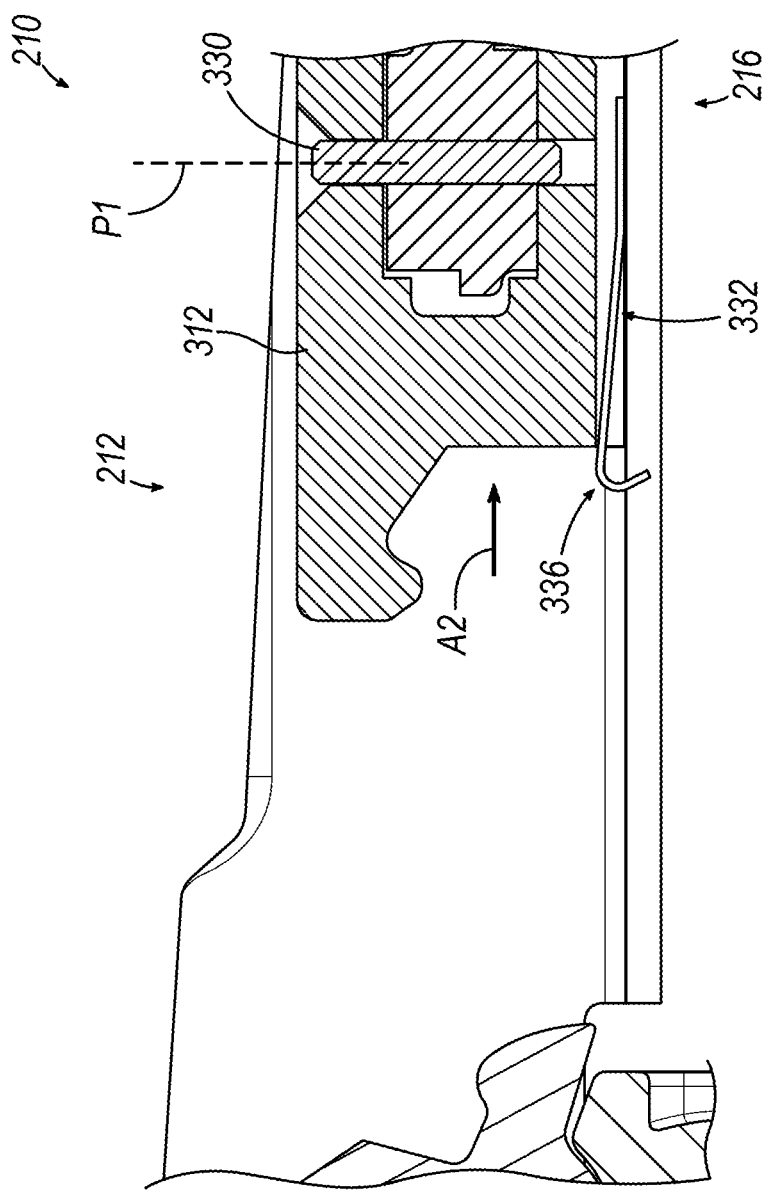
FIG. 12C depicts another cross-sectional side view of the proximal portion of the linear surgical stapler of FIG. 10, showing the firing assembly advancing distally through a firing stroke with the firing actuator in the deployed position and the firing lockout member in the disengaged position.

Referring again to FIG. 12B, when firing actuator (314) is provided in the retracted position with proximal end (336) in the disengaged position, finger (346) can simultaneously position proximal end (336) adjacent to a sloped bottom surface (350) of slide block (312). When firing assembly (310) is subsequently fired, sloped bottom surface (350) interacts with proximal end (336) to urge proximal end (336) beneath slide block (312), as illustrated in FIG. 12C, which allows slide block (312) to travel over leaf spring (332) (e.g., in the direction of arrow A2) during advancement of firing assembly (310) further towards the firing position. Proximal end (336) of leaf spring (332) is biased towards the engaged position. As such, when firing assembly (310) is returned from the firing position to the home position, proximal end (336) is automatically reinserted into channel (338) to resume proximal end (336) to the engaged position from the disengaged position if the firing actuator (314) is subsequently transitioned out of the deployed position prior to the next firing. Leaf spring (332) is therefore configured to transition between the retracted position and the deployed position only when firing assembly (310) is in the home position.

Leaf spring (332) is shown to be movable within channel (338) and in a direction that is transverse to a longitudinal axis of the stapler (210) when transitioning between the engaged position and the deployed position. As such the leaf spring (332) can be considered to be in an upward position relative to slide block (312) when in the engaged position, and in a lowered position relative to slide block (312) when in the disengaged. It is to be appreciated, however, that a leaf spring or other lockout member can be provided in any variety of suitable alternative configurations that movable with respect to a slide block to facilitate selective inhibition of advancement of the firing assembly into the firing position. For example, a leaf spring may be positioned on one of the elongate beams (318) and movable laterally relative to slide block (312) between the engaged position and the disengaged position.

Figure 13A:
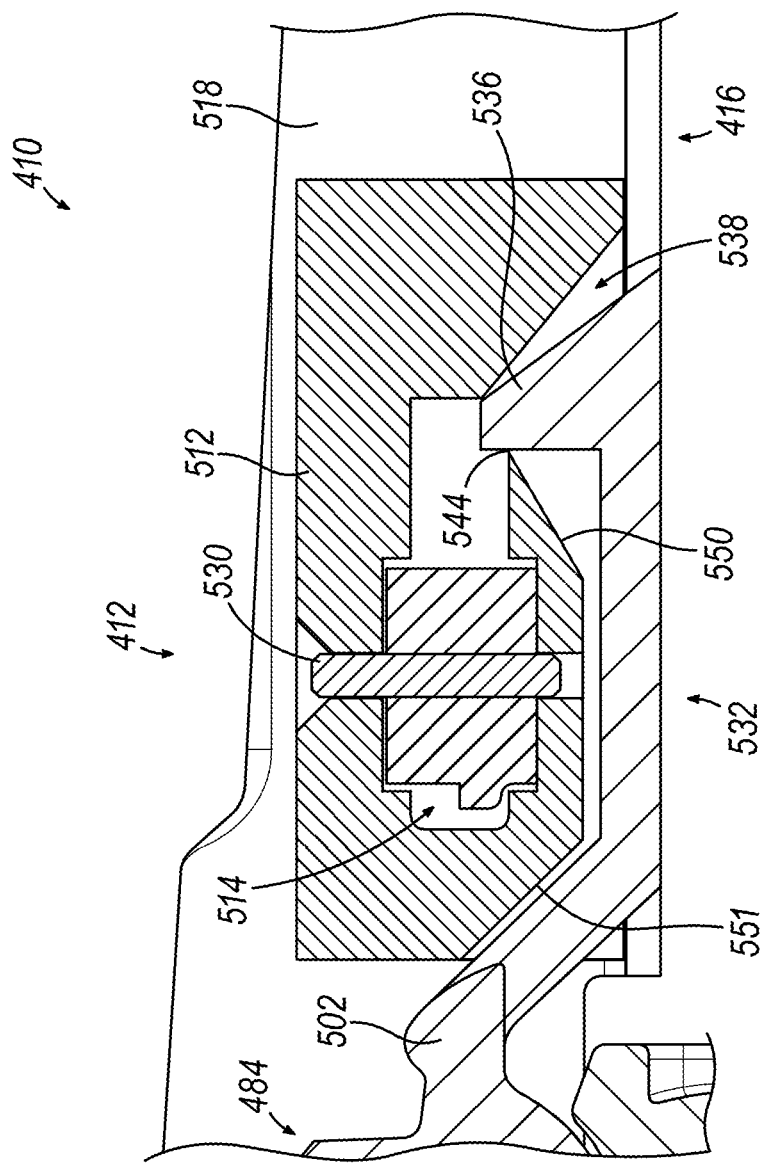
FIG. 13A depicts a cross-sectional side view of a proximal portion of another illustrative linear surgical stapler having a firing lockout member, showing the firing assembly in a proximal home position with both firing actuators in retracted positions and the firing lockout member in an engaged position that inhibits distal actuation of the firing assembly through a firing stroke.

B. Rotatable Member Having Arm for Selectively Inhibiting Firing of Firing Assembly FIGS. 13A-13D show another illustrative stapler (410) that is generally similar to staplers (10, 210) described above except as otherwise described below. As illustrated in FIG. 13A, stapler (410) includes a cartridge half (412) that includes a cartridge channel (416) and that cooperates with an anvil half (not shown) to releasably couple together to clamp tissue therebetween for simultaneous cutting and stapling of the clamped tissue. Cartridge channel (416) includes a pair of elongate beams (518) (one shown). A firing assembly includes a slidable body in the form of a slide block (512) and a firing actuator (514) pivotably coupled to slide block (512) by a pin (530). Another firing actuator (not shown) can be provided on an opposite side of cartridge half (412) in a similar manner as firing actuator (316) described above. For purposes of illustration, the operation of firing actuator (514) will be described but can be understood to be representative of the operation of both firing actuators. Elongate beams (518) extend distally from slide block (512) and accommodate sliding of the slide block (512) such that slide block (512) and firing actuator (514) are configured to translate together between the home position and the fired position.

Figure 13B:
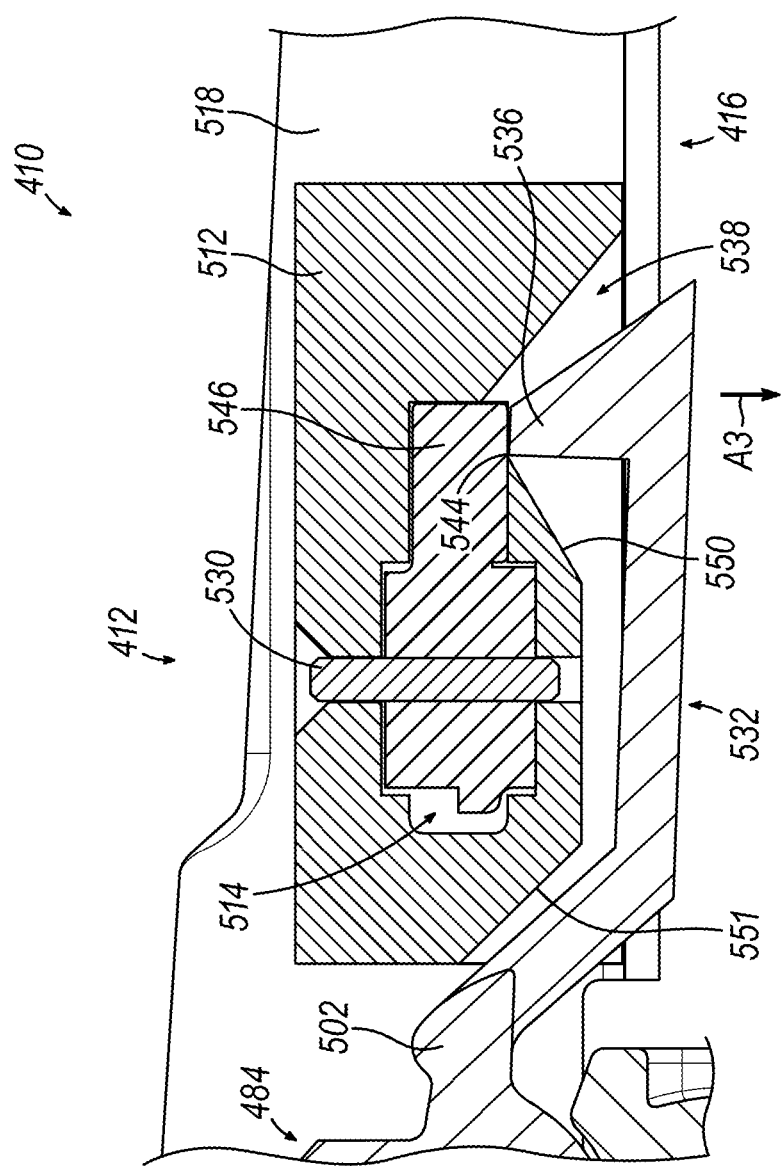
FIG. 13B depicts another cross-sectional side view of the proximal portion of the linear surgical stapler of FIG. 13A, showing the firing lockout member moved to a disengaged position by a firing actuator in the deployed position.

As illustrated in FIGS. 13A and 13B, firing actuator (514) is pivotable about pin (530) and relative to slide block (512) between a retracted position (FIG. 13A) and a deployed position (FIG. 13B). A rotatable body in the form of a detent member (484) is provided at a proximal end of cartridge half (412) and is configured to selectively maintain the firing assembly in its home position via a distal finger (502). A firing lockout member in the form of an arm (532) extends distally from distal finger (502) and inhibits advancement of the firing assembly into the fired position until the firing actuator (514) is pivoted into the deployed position, as will be described in further detail below. The arm (532) is disposed between elongate beams (518) and includes a distal latch (536) selectively interfaces with slide block (512). Slide block (512) defines a channel (538) that accommodates distal latch (536) of arm (532).

As illustrated in FIGS. 13A and 13B, arm (532) is movable between an engaged position (FIG. 13A) and a disengaged position (FIG. 13B). When arm (532) is in the engaged position, as illustrated in FIG. 13A, distal latch (536) is disposed adjacent to a stop surface (544) disposed at a proximal end of channel (538). If the firing assembly (e.g., 310) is then urged from the home position toward the firing position, distal latch (536) contacts stop surface (544) to inhibit advancement of the firing assembly towards the firing position. When arm (532) is in the disengaged position, as illustrated in FIG. 13B, distal latch (536) is disposed beneath stop surface (544) and thus no longer inhibits firing of the firing assembly into the firing position.

Arm (532) is configured to transition from the engaged position to the disengaged position in response to the firing actuator (514) transitioning from the retracted position to the deployed position. Firing actuator (514) includes a finger (546) (FIG. 13B) that includes a chamfered surface (not shown). As illustrated in FIG. 13A, when firing actuator (514) is in the retracted position, finger (546) and chamfered surface are spaced apart from distal latch (536) and channel (538) such that arm (532) is provided in the engaged position with distal latch (536) in direct contact with stop surface (544) to inhibit sliding of slide block (512), and thus the firing assembly, from the home position towards the firing position. When firing actuator (514) is then pivoted into the deployed position, finger (546) is correspondingly pivoted into position over distal latch (536). Such pivoting of finger (546) can cause the chamfered surface to engage distal latch (536) and correspondingly move arm (532) into the disengaged position (e.g., in the direction of arrow A3), as illustrated in FIG. 13B, while simultaneously pivoting distal finger (502) out of engagement with the firing assembly. The distal latch (536) is correspondingly released from direct contact with stop surface (544) in conjunction with distal finger (502) being released from the firing assembly which allows for firing of the firing assembly from the home position to the fired position. In one example, pivoting of arm (532) to the disengaged position in this manner can cause a portion of distal latch (536) to protrude through cartridge channel (416) to provide a visual indication to a user that the firing actuator (514) is in a properly deployed position for firing the firing assembly. It is to be appreciated that arm (532) is therefore configured to assume the disengaged position only when the firing actuator (514) is in the deployed position. As such, the firing assembly is prevented from firing, unless and until, firing actuator (514) is pivoted to the retracted position which can prevent inadvertent firing of firing assembly until firing actuator (514) is properly provided in the deployed position.

Figure 13C:
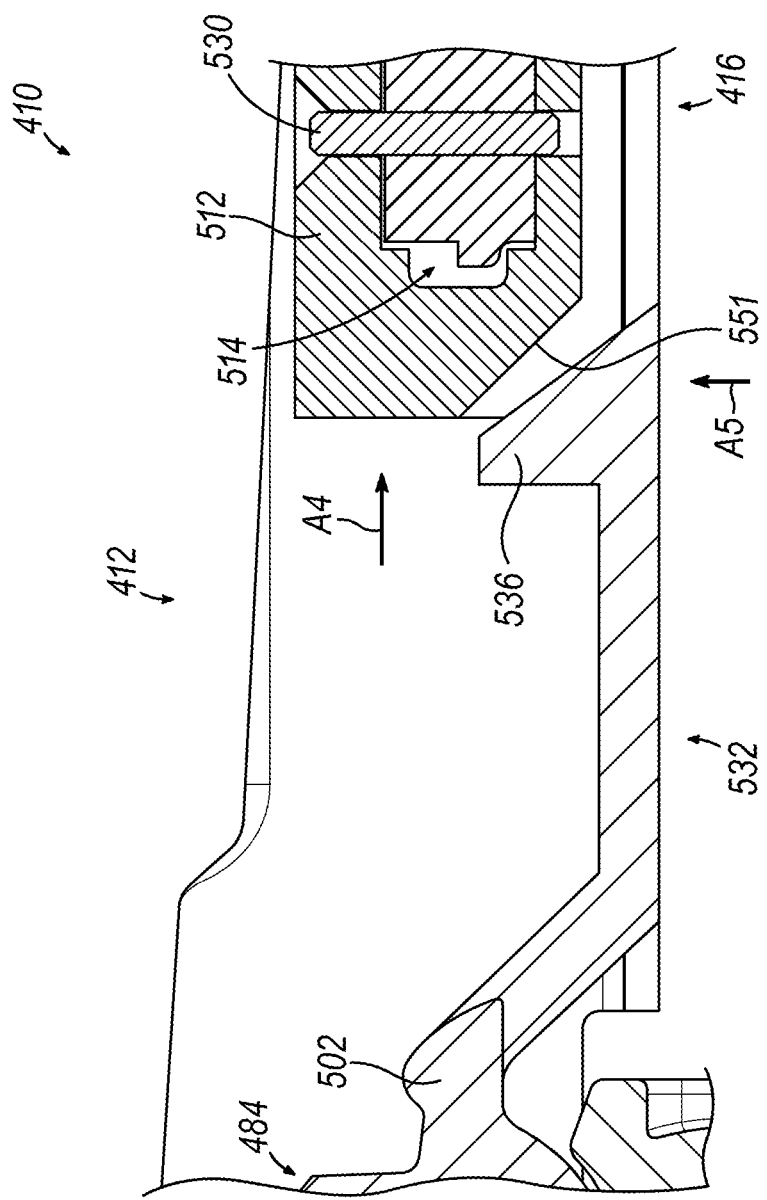
FIG. 13C depicts another cross-sectional side view of the proximal portion of the linear surgical stapler of FIG. 13A, showing the firing assembly having advanced distally through a first portion of a firing stroke with the firing actuator in the deployed position such that the firing lockout member can resume its position of FIG. 13A.

Referring again to FIG. 13B, when firing actuator (514) is provided in the retracted position with arm (532) in the disengaged position, finger (546) can simultaneously position distal latch (536) adjacent to a sloped distal bottom surface (550) of slide block (512). When the firing assembly is subsequently fired, sloped distal bottom surface (550) interacts with distal latch (536) to urge distal latch (536) beneath slide block (512) which allows slide block (512) to travel over distal latch (536) in the direction of arrow A4 (FIG. 13C). Arm (532) is biased towards the engaged position such that once slide block (512) moves distally past distal latch (536), as illustrated in FIG. 12C, arm (532) returns to the engaged position (e.g., in the direction of arrow A5). As illustrated in FIGS. 13C and 13D, slide block (512) includes a sloped proximal bottom surface (551). When the firing assembly is returned from the firing position to the home position, as illustrated in FIG. 13D, sloped proximal bottom surface (551) interacts with distal latch (536) to urge distal latch (536) beneath slide block (512) in the direction of arrow A6 which allows slide block (512) to travel over distal latch (536) in the direction of arrow A7 until arm (532) returns to the engaged position illustrated in FIG. 13A.

C. Plunger for Selectively Inhibiting Firing of Firing Assembly

Figure 14:
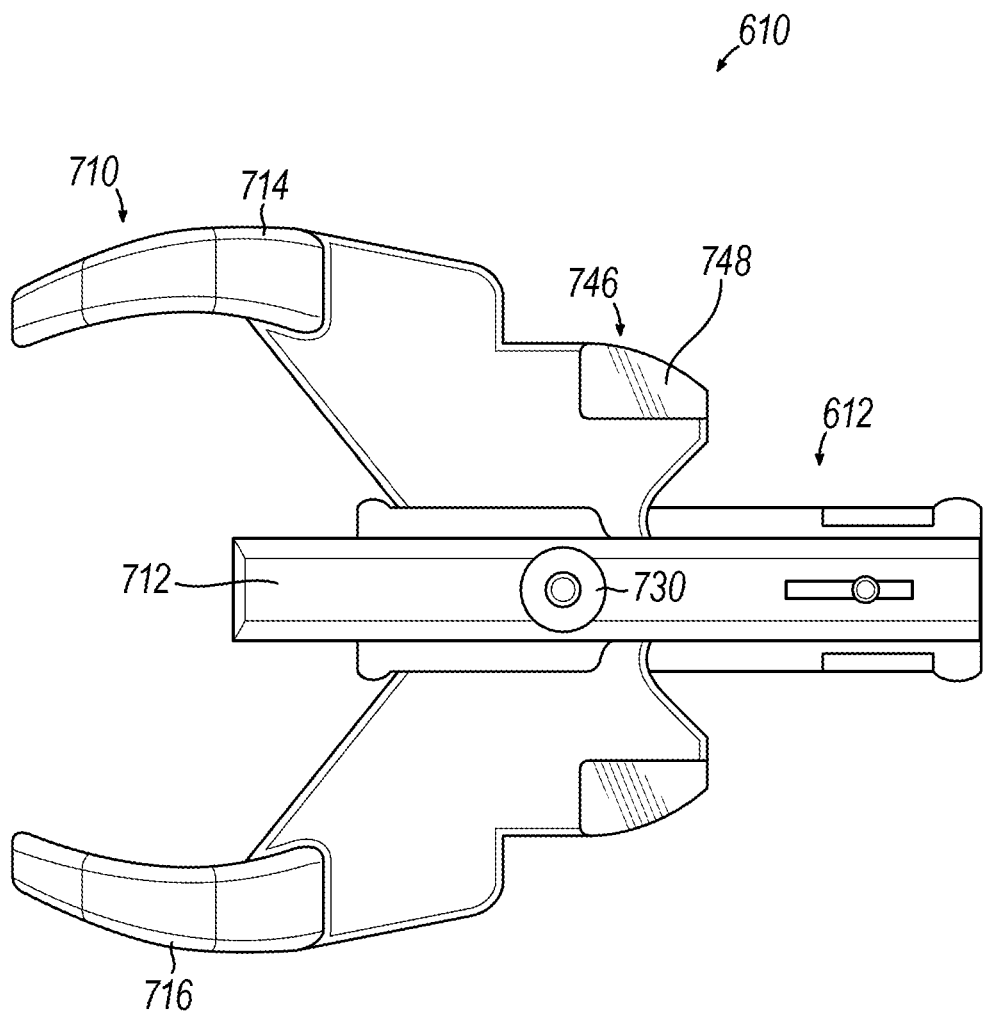
FIG. 14 depicts a top elevational view of a firing assembly of another illustrative linear surgical stapler, showing a slide block, a pair of firing actuators, and a firing lockout member, with certain other features of the firing assembly omitted.
Figure 15A:
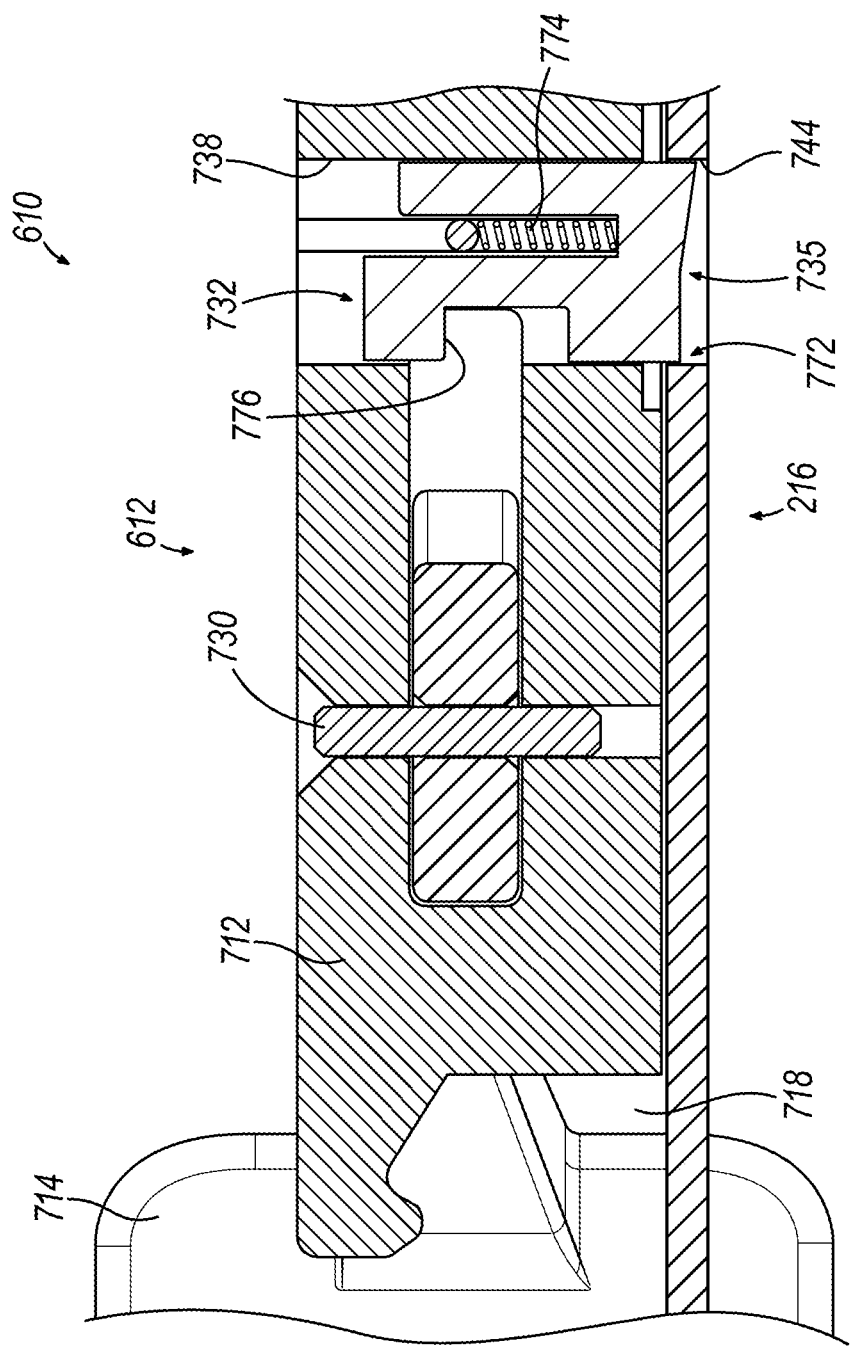
FIG. 15A depicts a cross-sectional side view of a proximal portion of a linear surgical stapler that includes the firing assembly of FIG. 14, showing the firing assembly in a proximal home position with both firing actuators in retracted positions and the firing lockout member in an engaged position that inhibits distal actuation of the firing assembly through a firing stroke.
Figure 15B:
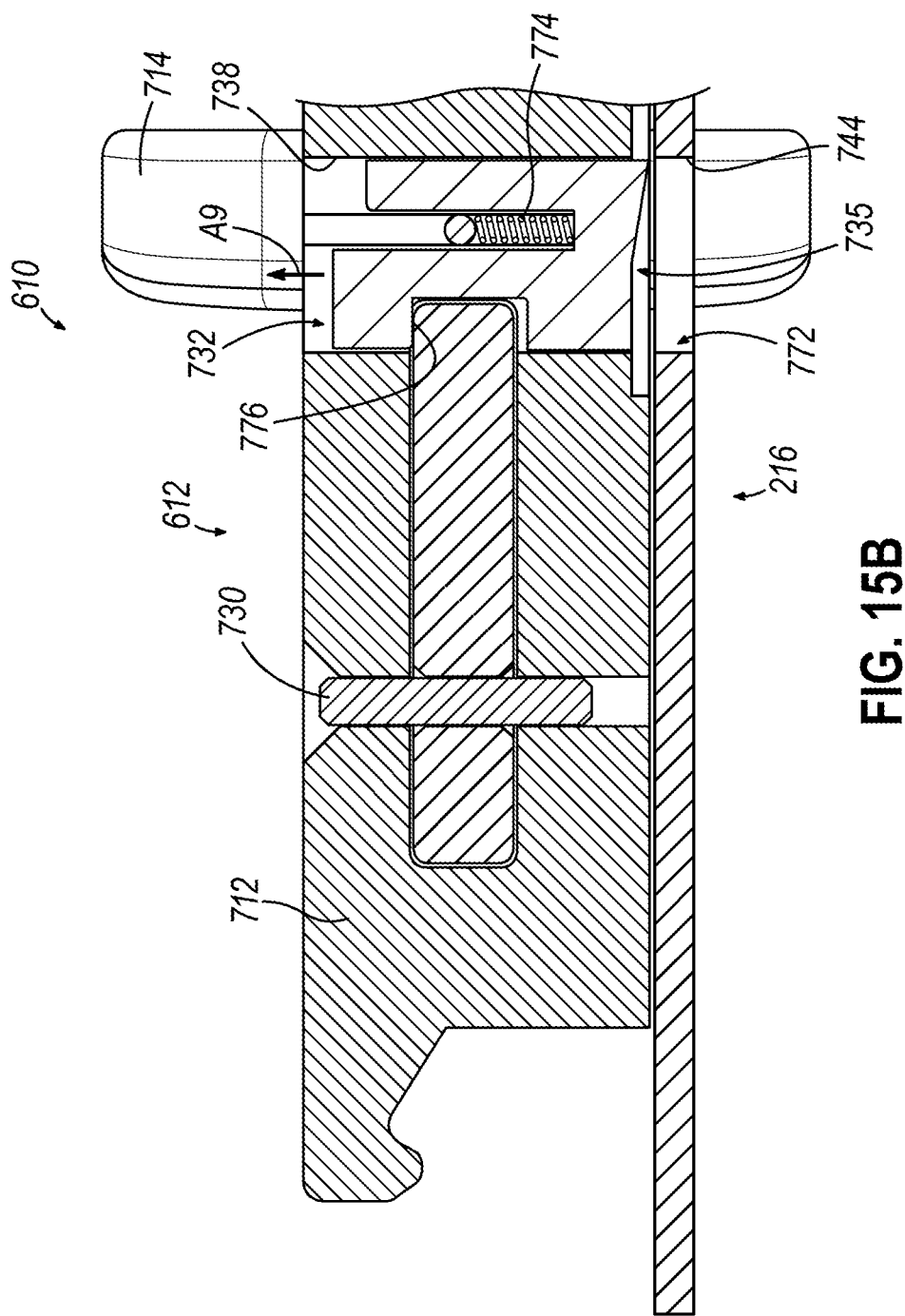
FIG. 15B depicts another cross-sectional side view of the proximal portion of the linear surgical stapler of FIG. 15A, showing the firing lockout member moved to a disengaged position by a firing actuator in the deployed position.

FIGS. 14-15B show another illustrative stapler (610) that is generally similar to staplers (10, 210, 410) described above except as otherwise described below. As illustrated in FIGS. 14 and 15A, stapler (610) includes a cartridge half (612) that cooperates with an anvil half (not shown) to releasably couple together to clamp tissue therebetween for simultaneous cutting and stapling of the clamped tissue. As illustrated in FIG. 14, stapler (610) includes a firing assembly (710) includes a slidable body in the form of a slide block (712) and a pair of firing actuators (714, 716) pivotably coupled to slide block (712) by a pin (730). Each firing actuator (714, 716) is pivotable about pin (730), and relative to slide block (712) and to each other, between a retracted position and a deployed position. When either of the firing actuators (714, 716) are in the deployed position, the deployed firing actuator (714, 716) may be driven distally by an operator to actuate firing assembly (710) distally through stapler (610) to thereby simultaneously cut and staple tissue clamped between cartridge and anvil halves.

Referring now to FIGS. 15A and 15B, cartridge half (612) includes a cartridge channel (616) that includes a pair of elongate beams (718) (one shown). Elongate beams (718) extend distally from slide block (712) and accommodate sliding of the slide block (712) such that slide block (712) and firing actuators (714, 716) are configured to translate together between the home position and the fired position. A firing lockout member in the form of a plunger (732) is disposed in a channel (738) that is defined by slide block (712) and is movable together with firing assembly (710) between the home position and the firing position. Plunger (732) is configured to selectively inhibit advancement of the firing assembly (710) into the fired position until one of the firing actuators (714, 716) is pivoted into the deployed position, as will be described in further detail below.

As illustrated in FIGS. 15A and 15B, plunger (732) is slidable (e.g., translatable) relative to slide block (712) between an engaged position (FIG. 15A) and a disengaged position (FIG. 15B). When plunger (732) is in the engaged position, as illustrated in FIG. 15A, a lower portion (736) extends through an opening (772) in cartridge channel (616) and is disposed adjacent to a stop surface (744). If firing assembly (710) is then urged from the home position toward the firing position, lower portion (736) contacts stop surface (744) to inhibit advancement of firing assembly (710) towards the firing position. When plunger (732) is in the disengaged position, as illustrated in FIG. 15B, lower portion (736) is disposed above stop surface (744) and thus no longer inhibits firing of firing assembly (710) into the firing position. A biasing member (774) is associated with plunger (732) and is configured to bias plunger (732) into the engaged position.

Plunger (732) is configured to transition from the engaged position to the disengaged position in response to one of the firing actuators (714, 716) transitioning from the retracted position to the deployed position. Operation of firing actuator (714) will now be described relative to plunger (732) but can be understood to also be representative of the operation of firing actuator (716). As illustrated in FIG. 14, firing actuator (714) includes a finger (746) that includes a chamfered surface (748). Pivoting of firing actuator (714) between the deployed and retracted position can move finger (746) and chamfered surface (748) into and out of engagement with plunger (732) to facilitate movement of plunger (732) between the disengaged position and the engaged position. For example, as illustrated in FIG. 15A, when firing actuator (714) is in the retracted position, finger (746) and chamfered surface (748) are disengaged from plunger (732) such that plunger (732) is in the engaged position with lower portion (736) directly contacting stop surface (744) to inhibit sliding of slide block (712), and thus firing assembly (710), from the home position towards the firing position. When firing actuator (714) is then pivoted into the deployed position, finger (746) is correspondingly pivoted into engagement with plunger (732) which causes chamfered surface (748) to engage an upper shoulder (776) of plunger (732) to correspondingly move plunger (732) into the disengaged position (e.g., in the direction of arrow A9), as illustrated in FIG. 15B, which disengages lower portion (736) from stop surface (744) to allow for firing of firing assembly (710) from the home position to the fired position.

III. Illustrative Firing Lockouts That Require Full Approximation of Stapler Halves In some other instances, it may be desirable to equip linear surgical stapler (10) with a firing lockout member that inhibits firing by a user unless stapler halves (12, 14) are fully approximated together with clamp lever (40) in the closed position. FIGS. 16A-18 show illustrative versions of linear surgical staplers configured in such a manner. It should be understood that the features discussed below may be readily combined with the features of any of the other staplers disclosed herein, such as stapler (10). To this end, like numbers below indicate like features described above in greater detail.

A. Protrusion that Selectively Interacts with Slot on Firing Actuator

Figure 16A:
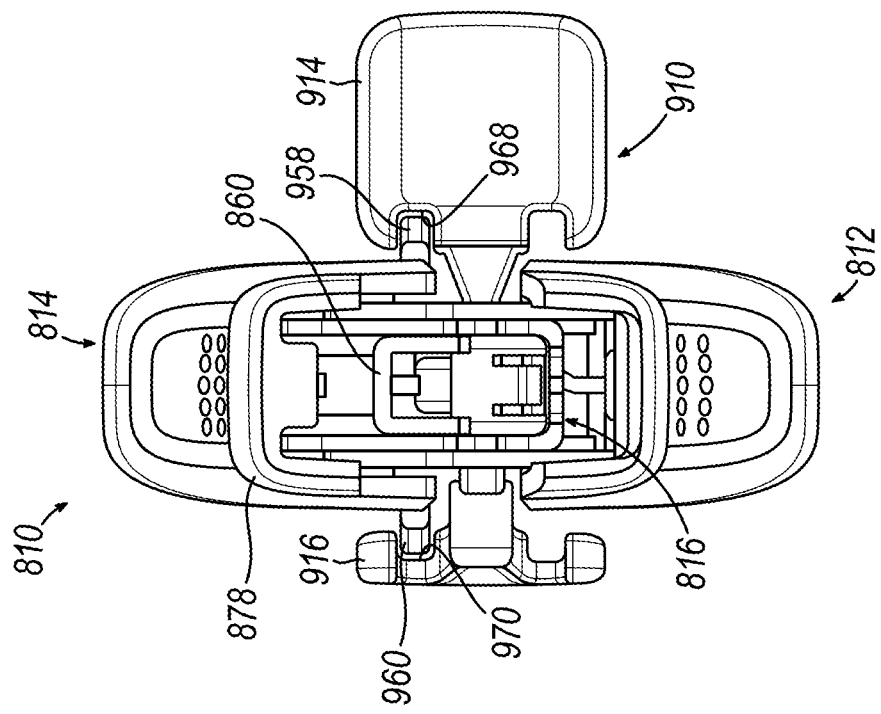
FIG. 16A depicts a front elevational view of another illustrative linear surgical stapler having a firing lockout member, showing the stapler halves fully approximated with the clamp lever in the closed position such that the firing lockout member is configured to permit distal actuation of the firing assembly through a firing stroke.

FIGS. 16A-17B show another illustrative stapler (810) that is generally similar to staplers (10, 210, 410, 610) described above except as otherwise described below. As illustrated in FIGS. 16A-17B, stapler (810) includes a cartridge half (812) and an anvil half (814) configured to releasably couple together to clamp tissue therebetween for simultaneous cutting and stapling of the clamped tissue. As illustrated in FIG. 16A, cartridge half (812) includes a clamp lever (840) pivotably coupled to a cartridge channel (816). Clamp lever (840) is actuatable by a user from an opened position to a closed position to approximate cartridge half (812) and anvil half (814) and thereby clamp tissue between distal jaw portions (e.g., 20, 64). Stapler (810) further includes a pair of shrouds (856, 878) that cover select portions of stapler (810) and promote effective grip and manipulation of stapler (810) by an operator during use. In the present example, a clamp lever shroud (856) is affixed to and covers an outwardly facing side of clamp lever (840) such that clamp lever shroud (856) is configured to pivot with clamp lever (840). Additionally, an anvil shroud (878) is affixed to and covers an outwardly facing side of an anvil channel (860).

A firing assembly (910) is actuatable by a user through a firing stroke from a home position to a fired position to fire a stapling assembly on the clamped tissue. Firing assembly (910) includes a pair of firing actuators (914, 916) that are pivotable between a retracted position, as illustrated by firing actuator (916) in FIGS. 16A and 16B, and a deployed position, as illustrated by firing actuator (914) in FIGS. 16A and 16B. When either of the firing actuators (914, 916) are in the deployed position, the deployed firing actuator (914, 916) may be driven distally by an operator to actuate firing assembly (910) distally through stapler (810) to thereby simultaneously cut and staple tissue clamped between cartridge and anvil halves (812, 814).

Figure 17A:
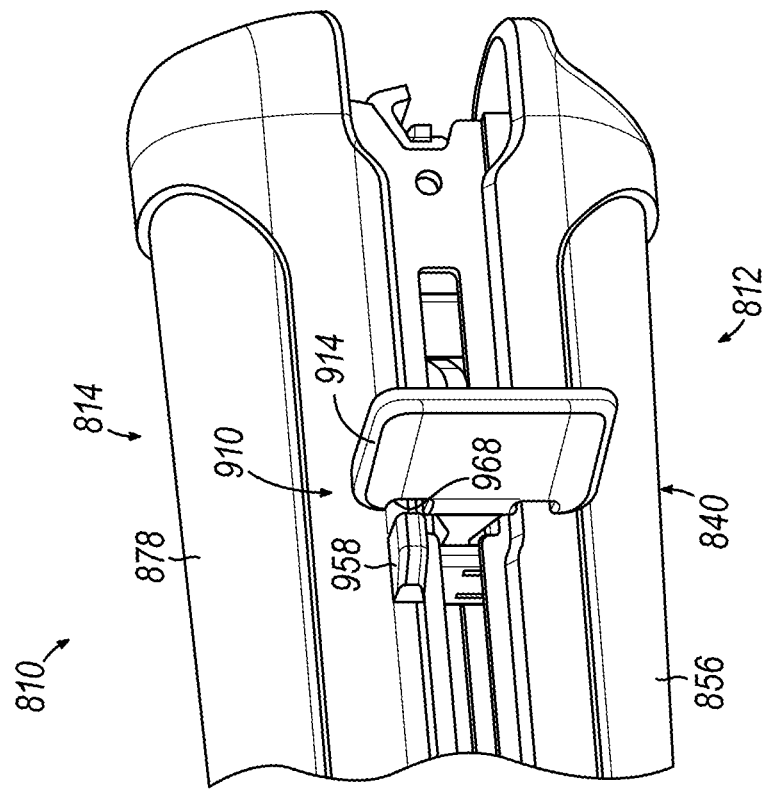
FIG. 17A depicts a perspective view of a proximal portion of the linear surgical stapler of FIG. 16A in the fully approximated state, showing the firing lockout member aligned with a slot in a deployed firing actuator of the firing assembly to thereby permit distal actuation of the firing assembly through a firing stroke.
Figure 17B:
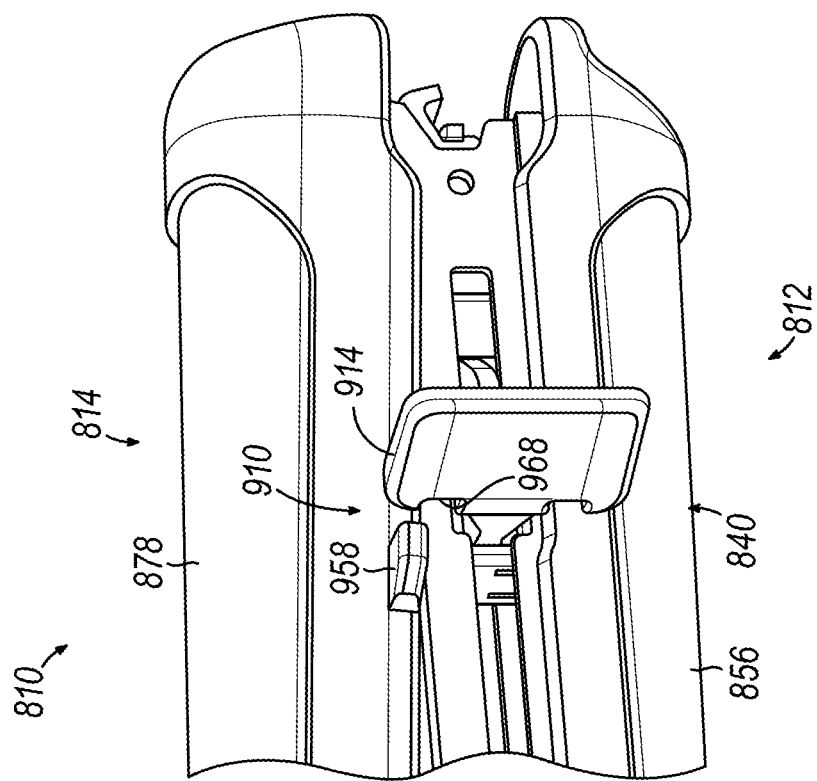
FIG. 17B depicts a perspective view of the proximal portion of the linear surgical stapler of FIG. 16B in the partially approximated state, showing the firing lockout member misaligned with the slot in the deployed firing actuator of the firing assembly to thereby inhibit distal actuation of the firing assembly through a firing stroke.
Figure 16B:
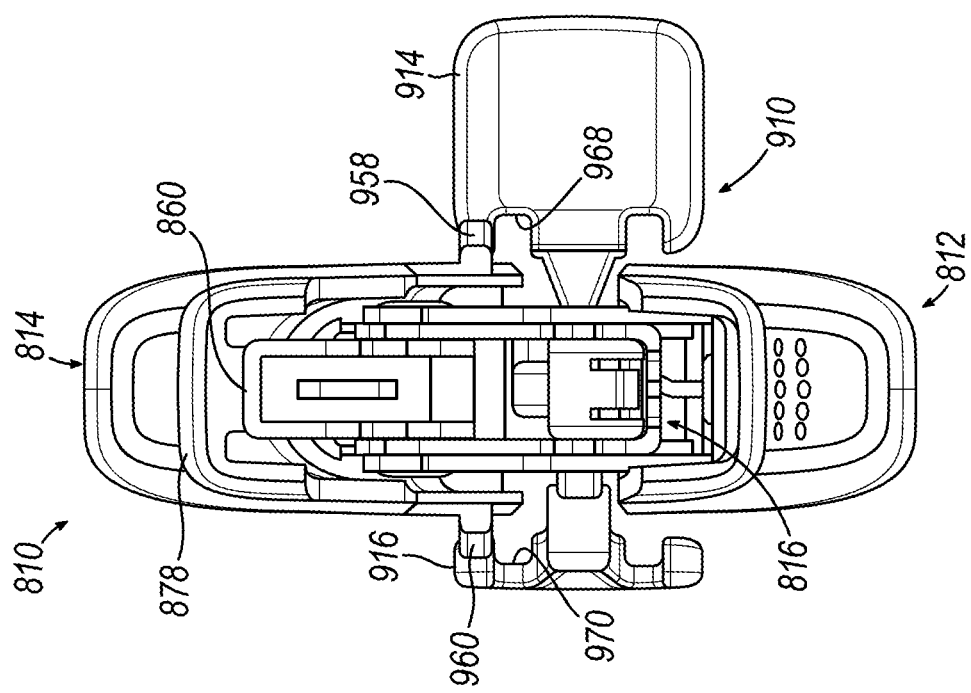
FIG. 16B depicts another front elevational view of the linear surgical stapler of FIG. 16A, showing the stapler halves only partially approximated such the firing lockout member is configured to inhibit distal actuation of the firing assembly through a firing stroke.

In order to facilitate clamping of tissue between cartridge half (812) and anvil half (814), cartridge half (812) and anvil half (814) are first provided in a hang-open state (see FIG. 9C) which allows for positioning of tissue between distal jaw portions (e.g., 20, 64). Cartridge half (812) and anvil half (814) are then pivoted towards each other to sandwich the tissue between the distal jaw portions (e.g., 20, 64). The clamp lever (840) is then moved to the closed position to approximate cartridge half (812) and anvil half (814) together. If cartridge half (812) and anvil half (814) are properly engaged with each other and clamp lever (840) is moved to the closed position, cartridge half (812) and anvil half (814) can be pulled into a fully approximated state, as illustrated in FIGS. 16A and 17A, which allows the firing assembly (910) to properly cut and staple the tissue. However, if cartridge half (812) and anvil half (814) are not properly engaged with each other (e.g., due to excessively thick tissue and/or improper positioning of cartridge half (812) and anvil half (814) relative to each other) and clamp lever (840) is moved to the closed position, cartridge half (812) and anvil half (814) might not be fully approximated together, as illustrated in FIGS. 16B and 17B. When cartridge half (812) and anvil half (814) are in this partially approximated state, firing of the firing assembly (910) can result in improper cutting and stapling of the tissue.

A pair of firing lockout members in the form of protrusions (958, 960) are accordingly provided that are configured to selectively engage the firing actuators (914, 916) respectively, to thereby inhibit actuation of the firing assembly (910) through the firing stroke when cartridge half (812) and anvil half (814) are not fully approximated with clamp lever (840) in the closed position. As illustrated in FIGS. 16A and 16B, each protrusion (958, 960) is provided on an opposite side of clamp lever shroud (856) and extends outwardly therefrom adjacent to firing actuators (914, 916), respectively. Each firing actuator (914, 916) defines a slot (968, 970) that is configured to accommodate a corresponding one of the protrusions (958, 960) when cartridge half (812) and anvil half (814) are fully approximated.

The interaction of firing actuator (914) with protrusion (958) will now be described but can be understood to be representative of the interaction of firing actuator (916) with protrusion (960) which can be independent of the interaction of firing actuator (914) with protrusion (958). When cartridge half (812) and anvil half (814) are fully approximated, as illustrated in FIGS. 16A and 17A, protrusion (958) is aligned with slot (968) of firing actuator (914). When firing actuator (914) is the deployed position and firing assembly (910) is subsequently advanced from the home position and towards the fired position, the protrusion (958) is permitted to pass through the slot (968) to allow the firing assembly (910) to proceed through the firing stroke. In one example, the slot (968) can extend throughout the entire length of the firing actuator (914) such that the firing assembly (910) can be fired regardless of whether the firing actuator (914) is in the deployed or retracted position. In another example, slot (968) can only extend partially through the length of the firing actuator (914) such that slot (968) is configured to only permit passage of the protrusion (958) therethrough when the firing actuator (914) is in the deployed position.

When cartridge half (812) and anvil half (814) are only partially approximated, as illustrated in FIGS. 16B and 17B, protrusion (958) is not aligned with slot (968) of firing actuator (914). As such, when firing assembly (910) is encouraged from the home position towards the fired position, protrusion (958) contacts a portion of firing actuator (914) adjacent to slot (968) to prevent firing assembly (910) from proceeding distally towards the fired position which can indicate to a user that the cartridge half (812) and anvil half (814) are misaligned and requires further alignment to allow for proper stapling and cutting of the tissue. It is to be appreciated that although protrusions (958, 960) are illustrated above, any of a variety of suitable alternative firing lockout member arrangements are contemplated that engage firing assembly (910) to thereby inhibit its advancement through the firing stroke when cartridge half (812) and anvil half (814) are not fully approximated with clamp lever (840).

Figure 18:
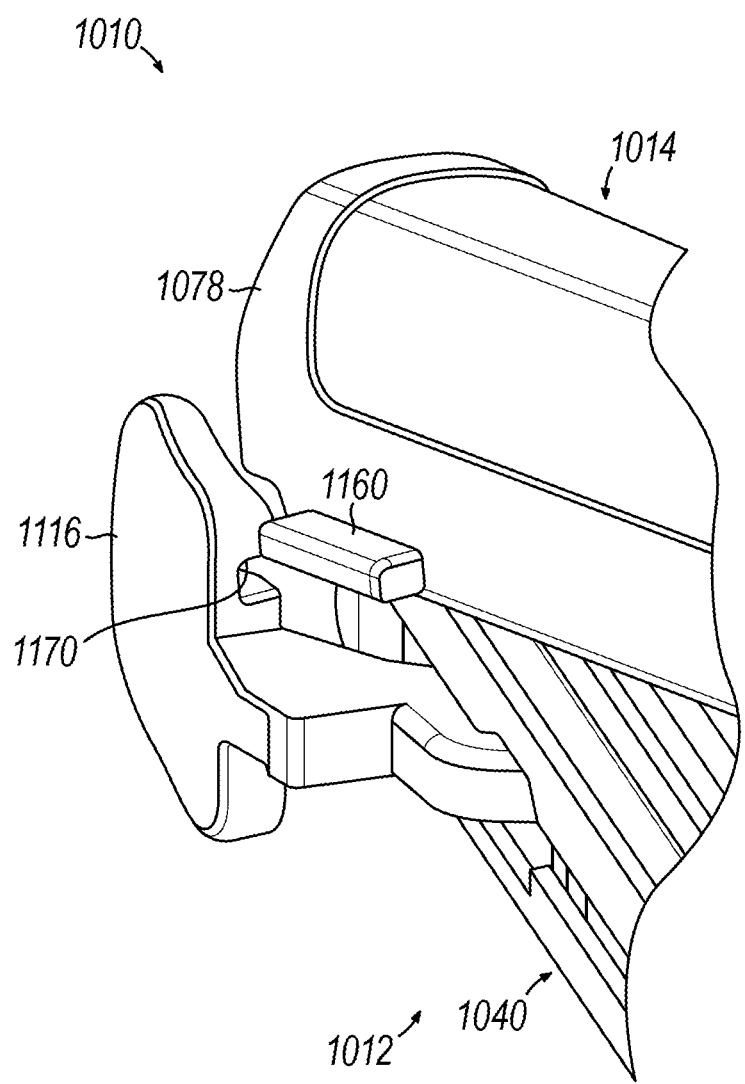
FIG. 18 depicts a perspective view of a proximal portion of another illustrative linear surgical stapler having a firing lockout member, showing the stapler halves only partially approximated such that the firing lockout member inhibits deployment of the firing actuators and thus distal actuation of the firing assembly through a firing stroke.

B. Proximally Positioned Protrusion that Selectively Interacts with Slot on Firing Actuator FIG. 18 shows yet another illustrative stapler (1010) that is generally similar to staplers (10, 210, 410, 610, 810) described above except as otherwise described below. Stapler (1010) includes a cartridge half (1012) and an anvil half (1014) configured to releasably couple together to clamp tissue therebetween for simultaneous cutting and stapling of the clamped tissue. Cartridge half (1012) includes a clamp lever (1040) that is actuatable by a user from an opened position to a closed position to approximate cartridge half (1012) and anvil half (1014) and thereby clamp tissue between distal jaw portions (e.g., 20, 64). Stapler (1010) further includes an anvil shroud (1078) that is affixed to and at least partially covers anvil half (1014). A firing actuator (1116) is provided to facilitate firing of a firing assembly from a home position to a fired position. Firing actuator (1116) defines a slot (1170) that can be selectively aligned a protrusion (1160) to selectively inhibit actuation of the firing assembly through the firing stroke when cartridge half (1012) and an anvil half (1014) are not fully approximated with the clamp member (1040) in the closed position. However, protrusion (1160) is shown to be positioned further proximately on anvil shroud (1078) than protrusions (958, 960) illustrated in 16A-17B.

IV. Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus, comprising: (a) a first stapler half having a first distal jaw portion configured to present a stapling assembly having a plurality of staples; (b) a second stapler half having a second distal jaw portion configured to present an anvil having a plurality of staple forming pockets, wherein the first and second stapler halves are configured to selectively couple together and separate from one another; (c) a clamp member presented by one of the first stapler half or the second stapler half, wherein the clamp member is actuatable by a user to approximate the first and second stapler halves and thereby clamp tissue between the first and second distal jaw portions; (d) a firing assembly presented by one of the first stapler half or the second stapler half, wherein the firing assembly is actuatable by a user through a firing stroke from a home position to a fired position to fire the stapling assembly on the clamped tissue, wherein the firing assembly includes a firing actuator movable by the user between a retracted position and a deployed position in which the firing actuator is configured to actuate the firing assembly through the firing stroke; and (e) a firing lockout member movable relative to the firing assembly between an engaged position and a disengaged position, wherein in the engaged position the firing lockout member is configured to inhibit advancement of the firing assembly from the home position toward the fired position, wherein in the disengaged position the firing lockout member is configured to permit advancement of the firing assembly from home position toward the fired position, wherein the firing lockout member is configured to assume the disengaged position only when the firing actuator is in the deployed position.

Example 2

The apparatus of Example 1, wherein the firing lockout member is configured to transition from the engaged position to the disengaged position in response to the firing actuator transitioning from the retracted position to the deployed position.

Example 3

The apparatus of any of the preceding Examples, wherein the firing lockout member is biased toward the engaged position such that the firing lockout member is configured to resume the engaged position from the disengaged position in response to the firing actuator transitioning out of the deployed position.

Example 4

The apparatus of any of the preceding Examples, wherein the firing lockout member is movable in a direction transverse to a longitudinal axis of the apparatus when transitioning between the engaged position and the disengaged position.

Example 5

The apparatus of any of the preceding Examples, wherein the firing actuator is configured to transition between the retracted position and the deployed position only when the firing assembly is in the home position.

Example 6

The apparatus of any of the preceding Examples, wherein the home position of the firing assembly comprises a proximal position and the fired position comprises a distal position, wherein the firing assembly is actuatable distally by the firing actuator from the home position to the fired position to fire the stapling assembly.

Example 7

The apparatus of any of the preceding Examples, wherein the firing assembly further includes a slide block configured to translate between the home position and the fired position, wherein the firing actuator is coupled with and movable relative to the slide block between the retracted position and the deployed position, wherein the firing lockout member is movable relative to the slide block between the engaged position and the disengaged position.

Example 8

The apparatus of Example 7, wherein the firing actuator is pivotably coupled with the slide block about a pivot axis that extends transversely to a direction of translation of the slide block, wherein the firing actuator is pivotable relative to the slide block about the pivot axis between the retracted position and the deployed position.

Example 9

The apparatus of any of Examples 7 through 8, wherein the firing lockout member in the engaged position is configured to directly contact the slide block and thereby inhibit translation of the slide block from the home position to the fired position.

Example 10

The apparatus of any of Examples 7 through 9, wherein the slide block includes a channel, wherein the firing lockout member is movable within the channel between the engaged position and the disengaged position.

Example 11

The apparatus of any of Examples 7 through 10, wherein the engaged position of the firing lockout member comprises one of a raised position or a lowered position relative to the slide block and the disengaged position comprises the other of a raised position or a lowered position relative to the slide block.

Example 12

The apparatus of any of the preceding Examples, wherein the firing lockout member is longitudinally fixed relative to the firing assembly.

Example 13

The apparatus of any of the preceding Examples, wherein the firing lockout member comprises a leaf spring.

Example 14

The apparatus of any of the preceding Examples, further comprising a rotatable member disposed at a proximal end of one of the first stapler half or the second stapler half, wherein the firing lockout members comprises an arm extending distally from the rotatable member.

Example 15

The apparatus of any of the preceding Examples, wherein the firing lockout member is movable with the firing assembly between the home position and the firing position and is translatable relative to a portion of the firing assembly between the engaged position and the disengaged position.

Example 16

An apparatus, comprising: (a) a first stapler half having a first distal jaw portion configured to present a stapling assembly having a plurality of staples; (b) a second stapler half having a second distal jaw portion configured to present an anvil having a plurality of staple forming pockets, wherein the first and second stapler halves are configured to selectively couple together and separate from one another; (c) a clamp member presented by one of the first stapler half or the second stapler half, wherein the clamp member is actuatable by a user from a first position to a second position to approximate the first and second stapler halves and thereby clamp tissue between the first and second distal jaw portions; (d) a firing assembly presented by the first stapler half, wherein the firing assembly is actuatable by a user through a firing stroke to fire the stapling assembly on the clamped tissue, wherein the firing assembly includes a firing actuator movable by the user between a retracted position and a deployed position in which the firing actuator is configured to actuate the firing assembly through the firing stroke; and (e) a firing lockout member presented by the second stapler half, wherein the firing lockout member is configured to engage the firing assembly and thereby inhibit its advancement through the firing stroke when the first and second stapler halves are not fully approximated with the clamp member in the second position.

Example 17

The apparatus of Example 16, wherein the second stapler half comprises a shroud and the firing lockout member comprises a protrusion that extends outwardly from the shroud, wherein the protrusion is configured to engage the firing actuator and thereby inhibit actuation of the firing assembly through the firing stroke when the first and second stapler halves are not fully approximated with the clamp member in the second position.

Example 18

The apparatus of Example 17, wherein the firing actuator includes a slot, wherein the slot is configured to align with and receive the protrusion therethrough to thereby permit at least one of deployment of the firing actuator or actuation of the firing assembly through the firing stroke when the first and second stapler halves are fully approximated with the clamp member in the second position.

Example 19

An apparatus, comprising: (a) a first stapler half having a first distal jaw portion configured to present a stapling assembly having a plurality of staples; (b) a second stapler half having a second distal jaw portion configured to present an anvil having a plurality of staple forming pockets, wherein the first and second stapler halves are configured to selectively couple together and separate from one another; (c) a clamp member presented by one of the first stapler half or the second stapler half, wherein the clamp member is actuatable by a user from a first position to a second position to approximate the first and second stapler halves and thereby clamp tissue between the first and second distal jaw portions; (d) a firing assembly presented by one of the first stapler half or the second stapler half, wherein the firing assembly is actuatable by a user through a firing stroke to fire the stapling assembly on the clamped tissue, wherein the firing assembly includes: (i) a sliding member, and (ii) a firing actuator movable by the user relative to the sliding member between a retracted position and a deployed position in which the firing actuator is configured to actuate the firing assembly through the firing stroke; and (e) a firing lockout member presented by one of the first stapler half or the second stapler half, wherein the firing lockout member is configured to directly contact one of the sliding member or the firing actuator and thereby inhibit the firing assembly from advancing through the firing stroke when at least one of: (i) the firing actuator is not in the deployed position, or (ii) the first and second stapler halves are not fully approximated with the clamp member in the second position.

Example 20

The apparatus of Example 19, wherein the apparatus is configured to transition from a lockout state when the firing lockout member inhibits actuation of the firing assembly through a firing stroke, and a fire state when the firing lockout member permits actuation of the firing assembly through a firing stroke, wherein the firing lockout member is configured to directly contact the firing actuator in at least one of the lockout state or the fire state.

V. Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The surgical instrument systems described herein have been described in connection with the deployment and deformation of staples; however, the embodiments described herein are not so limited. Various embodiments are envisioned which deploy fasteners other than staples, such as clamps or tacks, for example. Moreover, various embodiments are envisioned which utilize any suitable means for sealing tissue. For instance, an end effector in accordance with various embodiments can comprise electrodes configured to heat and seal the tissue. Also, for instance, an end effector in accordance with certain embodiments can apply vibrational energy to seal the tissue.

Versions of the devices described above may be designed to be disposed of after a single use, or they can be designed to be used multiple times. Versions may, in either or both cases, be reconditioned for reuse after at least one use. Reconditioning may include any combination of the steps of disassembly of the device, followed by cleaning or replacement of particular pieces, and subsequent reassembly. In particular, some versions of the device may be disassembled, and any number of the particular pieces or parts of the device may be selectively replaced or removed in any combination. Upon cleaning and/or replacement of particular parts, some versions of the device may be reassembled for subsequent use either at a reconditioning facility, or by an operator immediately prior to a procedure. Those skilled in the art will appreciate that reconditioning of a device may utilize a variety of techniques for disassembly, cleaning/replacement, and reassembly. Use of such techniques, and the resulting reconditioned device, are all within the scope of the present application.

By way of example only, versions described herein may be sterilized before and/or after a procedure. In one sterilization technique, the device is placed in a closed and sealed container, such as a plastic or TYVEK bag. The container and device may then be placed in a field of radiation that can penetrate the container, such as gamma radiation, x-rays, or high-energy electrons. The radiation may kill bacteria on the device and in the container. The sterilized device may then be stored in the sterile container for later use. A device may also be sterilized using any other technique known in the art, including but not limited to beta or gamma radiation, ethylene oxide, or steam.

Having shown and described various embodiments of the present invention, further adaptations of the methods and systems described herein may be accomplished by appropriate modifications by one of ordinary skill in the art without departing from the scope of the present invention. Several such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. An apparatus, comprising:
   (a) a first stapler half having a first distal jaw portion configured to present a stapling assembly having a plurality of staples;
   (b) a second stapler half having a second distal jaw portion configured to present an anvil having a plurality of staple forming pockets, wherein the first and second stapler halves are configured to selectively couple together and separate from one another;
   (c) a clamp presented by one of the first stapler half or the second stapler half, wherein the clamp is actuatable by a user to approximate the first and second stapler halves and thereby clamp tissue between the first and second distal jaw portions;
   (d) a firing assembly presented by one of the first stapler half or the second stapler half, wherein the firing assembly is actuatable by a user through a firing stroke from a home position to a fired position to fire the stapling assembly on the clamped tissue, wherein the firing assembly includes a firing actuator movable by the user between a retracted position and a deployed position in which the firing actuator is configured to actuate the firing assembly through the firing stroke; and
   (e) a firing lockout movable relative to the firing assembly between an engaged position and a disengaged position, wherein in the engaged position the firing lockout is configured to inhibit advancement of the firing assembly from the home position toward the fired position, wherein in the disengaged position the firing lockout is configured to permit advancement of the firing assembly from the home position toward the fired position,
   wherein the firing lockout is configured to assume the disengaged position only when the firing actuator is in the deployed position.

2. The apparatus of claim 1, wherein the firing lockout is configured to transition from the engaged position to the disengaged position in response to the firing actuator transitioning from the retracted position to the deployed position.

3. The apparatus of claim 2, wherein the firing lockout is biased toward the engaged position such that the firing lockout is configured to resume the engaged position from the disengaged position in response to the firing actuator transitioning out of the deployed position.

4. The apparatus of claim 1, wherein the firing lockout is movable in a direction transverse to a longitudinal axis of the apparatus when transitioning between the engaged position and the disengaged position.

5. The apparatus of claim 1, wherein the firing actuator is configured to transition between the retracted position and the deployed position only when the firing assembly is in the home position.

6. The apparatus of claim 1, wherein the home position of the firing assembly comprises a proximal position and the fired position comprises a distal position, wherein the firing assembly is actuatable distally by the firing actuator from the home position to the fired position to fire the stapling assembly.

7. The apparatus of claim 1, wherein the firing assembly further includes a slide block configured to translate between the home position and the fired position, wherein the firing actuator is coupled with and movable relative to the slide block between the retracted position and the deployed position, wherein the firing lockout is movable relative to the slide block between the engaged position and the disengaged position.

8. The apparatus of claim 7, wherein the firing actuator is pivotably coupled with the slide block about a pivot axis that extends transversely to a direction of translation of the slide block, wherein the firing actuator is pivotable relative to the slide block about the pivot axis between the retracted position and the deployed position.

9. The apparatus of claim 7, wherein the firing lockout in the engaged position is configured to directly contact the slide block and thereby inhibit translation of the slide block from the home position to the fired position.

10. The apparatus of claim 7, wherein the slide block includes a channel, wherein the firing lockout is movable within the channel between the engaged position and the disengaged position.

11. The apparatus of claim 7, wherein the engaged position of the firing lockout comprises one of a raised position or a lowered position relative to the slide block and the disengaged position comprises the other of a raised position or a lowered position relative to the slide block.

12. The apparatus of claim 1, wherein the firing lockout is longitudinally fixed relative to the firing assembly.

13. The apparatus of claim 12, wherein the firing lockout comprises a leaf spring.

14. The apparatus of claim 12, further comprising a rotatable body disposed at a proximal end of one of the first stapler half or the second stapler half, wherein the firing lockout comprises an arm extending distally from the rotatable body.

15. The apparatus of claim 1, wherein the firing lockout is movable with the firing assembly between the home position and the firing position and is translatable relative to a portion of the firing assembly between the engaged position and the disengaged position.

16. An apparatus, comprising:
(a) a first stapler half having a first distal jaw portion configured to present a stapling assembly having a plurality of staples;
(b) a second stapler half having a second distal jaw portion configured to present an anvil having a plurality of staple forming pockets, wherein the first and second stapler halves are configured to selectively couple together and separate from one another;
(c) a clamp presented by one of the first stapler half or the second stapler half, wherein the clamp is actuatable by a user from a first position to a second position to approximate the first and second stapler halves and thereby clamp tissue between the first and second distal jaw portions;
(d) a firing assembly presented by the first stapler half, wherein the firing assembly is actuatable by a user through a firing stroke to fire the stapling assembly on the clamped tissue, wherein the firing assembly includes a firing actuator movable by the user between a retracted position and a deployed position in which the firing actuator is configured to actuate the firing assembly through the firing stroke; and
(e) a firing lockout presented by the second stapler half, wherein the firing lockout is configured to engage the firing assembly and thereby inhibit its advancement through the firing stroke when the first and second stapler halves are not fully approximated with the clamp in the second position.

17. The apparatus of claim 16, wherein the second stapler half comprises a shroud and the firing lockout comprises a protrusion that extends outwardly from the shroud, wherein the protrusion is configured to engage the firing actuator and thereby inhibit actuation of the firing assembly through the firing stroke when the first and second stapler halves are not fully approximated with the clamp in the second position.

18. The apparatus of claim 17, wherein the firing actuator includes a slot, wherein the slot is configured to align with and receive the protrusion therethrough to thereby permit at least one of deployment of the firing actuator or actuation of the firing assembly through the firing stroke when the first and second stapler halves are fully approximated with the clamp in the second position.

19. An apparatus, comprising:
(a) a first stapler half having a first distal jaw portion configured to present a stapling assembly having a plurality of staples;
(b) a second stapler half having a second distal jaw portion configured to present an anvil having a plurality of staple forming pockets, wherein the first and second stapler halves are configured to selectively couple together and separate from one another;
(c) a clamp presented by one of the first stapler half or the second stapler half, wherein the clamp is actuatable by a user from a first position to a second position to approximate the first and second stapler halves and thereby clamp tissue between the first and second distal jaw portions;
(d) a firing assembly presented by one of the first stapler half or the second stapler half, wherein the firing assembly is actuatable by a user through a firing stroke to fire the stapling assembly on the clamped tissue, wherein the firing assembly includes:
(i) a slidable body, and
(ii) a firing actuator movable by the user relative to the slidable body between a retracted position and a deployed position in which the firing actuator is configured to actuate the firing assembly through the firing stroke; and
(e) a firing lockout presented by one of the first stapler half or the second stapler half, wherein the firing lockout is configured to directly contact one of the slidable body or the firing actuator and thereby inhibit the firing assembly from advancing through the firing stroke when at least one of:
(i) the firing actuator is not in the deployed position, or (ii) the first and second stapler halves are not fully approximated with the clamp in the second position.

20. The apparatus of claim 19, wherein the apparatus is configured to transition from a lockout state when the firing lockout inhibits actuation of the firing assembly through a firing stroke, and a fire state when the firing lockout permits actuation of the firing assembly through a firing stroke, wherein the firing lockout is configured to directly contact the firing actuator in at least one of the lockout state or the fire state.

* * * * *